(12) United States Patent
Lee et al.

(10) Patent No.: US 8,697,805 B2
(45) Date of Patent: Apr. 15, 2014

(54) RESIN COMPOSITION FOR A MOISTURE ABSORBING FILM, MOISTURE ABSORBING FILM FOR A PACKAGE, AND PREPARATION METHOD THEREOF

(71) Applicants: Yonsei University Wonju Industry-Academic Cooperation Foundation, Wonju-si (KR); Bosspack Co., Ltd, Seoul (KR)

(72) Inventors: Youn Suk Lee, Wonju-si (KR); Soung Gon Lee, Seongam-si (KR); Hong Yeol Choi, Seoul (KR)

(73) Assignees: Yonsei University Wonju Industry-Academic Cooperation Foundation, Wonju-si, Gangwon-do (KR); Bosspack Co., Ltd., Seoul (KR)

( * ) Notice: Subject to any disclaimer, the term of this patent is extended or adjusted under 35 U.S.C. 154(b) by 0 days.

(21) Appl. No.: 13/767,563

(22) Filed: Feb. 14, 2013

(65) Prior Publication Data

US 2013/0184410 A1    Jul. 18, 2013

Related U.S. Application Data

(63) Continuation-in-part of application No. PCT/KR2011/001086, filed on Feb. 18, 2011.

(30) Foreign Application Priority Data

Jan. 23, 2013   (KR) .................. 10-2013-0007363

(51) Int. Cl.
*C08F 8/00* (2006.01)
*C08L 23/10* (2006.01)
*C08L 33/02* (2006.01)
*C08L 33/04* (2006.01)
*C08L 33/24* (2006.01)

(52) U.S. Cl.
USPC ........... 525/191; 525/218; 525/221; 525/222; 525/240

(58) Field of Classification Search
USPC .......................... 525/191, 218, 221, 222, 240
See application file for complete search history.

(56) References Cited

U.S. PATENT DOCUMENTS

| 4,977,211 | A  | * | 12/1990 | Doi et al. ................. 525/54.31 |
| 6,626,607 | B1 | * | 9/2003 | Hiramatsu et al. ............. 404/71 |
| 8,367,570 | B2 | * | 2/2013 | Reneker et al. ............... 442/327 |
| 2002/0039869 | A1 | * | 4/2002 | Achille ...................... 442/417 |
| 2003/0065296 | A1 | * | 4/2003 | Kaiser et al. ................. 604/368 |
| 2004/0078015 | A1 |   | 4/2004 | Copat et al. |

FOREIGN PATENT DOCUMENTS

JP    6-80810    3/1994

OTHER PUBLICATIONS

Junping Zhang, et al. "Study on Superabsorbent Composite. XV. Effects of Ion-Exchanged Attapulgite on Water Absorbency of Superabsorbent Composites." Polymer Coposites, 2007, pp. 208-213. Published online at www.interscience.wiley.com.

* cited by examiner

*Primary Examiner* — Nathan M Nutter
(74) *Attorney, Agent, or Firm* — Novick, Kim & Lee, PLLC; Jae Youn Kim

(57) ABSTRACT

The present invention relates to a resin composition for moisture absorbing film comprising polyethylene resin and polyacrylic acid partial sodium salt (PAPSS) or attapulgite synthesized acrylic amide (ATPGAA) as a moisture absorbent, moisture absorbing film for packaging, and a method for manufacturing film, and the present invention also relates to a resin composition for seasoned laver packaging film to be used for maintaining the high quality of the merchandize with good taste and tissue dryness.

9 Claims, 14 Drawing Sheets

RESIN COMPOSITION FOR A MOISTURE ABSORBING FILM, MOISTURE ABSORBING FILM FOR A PACKAGE, AND PREPARATION METHOD THEREOF

CROSS-REFERENCES TO RELATED APPLICATION

This patent application is a Continuation-In-Part application of PCT/KR2011/001086 filed on Feb. 18, 2011, and the contents of which are incorporated herein by reference in its entirety. This patent application claims the benefit of priority from Korean Patent Application No. 10-2013-0007363 filed on Jan. 23, 2013, the contents of which are incorporated herein by reference.

BACKGROUND OF THE INVENTION

1. Field of the Invention

The present invention relates to a resin composition for a moisture absorbing film, to a moisture absorbing film for a package, and to a method for manufacturing same, the resin composition comprising polyethylene resin and polyacrylic acid partial sodium salt (PAPSS) or attapulgite synthesized acrylamide (ATPGAA) as a moisture absorbent.

2. Description of the Related Art

According to the recent development of modern industry, diversification and merchantability of products are considered to be important. In production, storage, distribution and sale of products, the consumer demand for handling convenience and quality preservation is growing.

Therefore, there is active research effort in the field of packaging industry to improve marketability of products to give functional factor(s) and to provide active effects into the product packaging, away from the conventional simple purpose of package protection and quality maintenance.

Nowadays, plastic packaging materials of foods, medicines, electronics and household goods have actively developed due to the lightweight, excellent gas barrier properties, transparency, and relatively low cost of plastic packaging.

Functional packaging materials in recent research mostly are produced by impregnation and coating of the packaging materials with active substances to improve the quality of products by consistently providing the products with maximum effect from the time of packaging. For example, there have been attempts to develop films such as nano-film for increasing moisture and gas barrier properties, film comprising zeolite for inhibiting growth of microorganisms of the products, far infrared radiation film emitting energy, off-flavor-adsorptive film, and oxygen and/or off-flavor gas-adsorptive film.

If food is moisture sensitive, there is a need for the insides of the packaging to remain dry because water activity is one of the factors which induce changes in the physical properties of product, occurrence of rancidity, loss of nutritional value, decrease of sensual properties, and food deterioration through microbial growth. Water activity may be also one of the factors to decrease the quality of the packaged products by inducing oxidation corrosion of a metal surface in the electronic products.

In order to solve these problems, food is typically treated with hot air-drying pretreatment, drying gas substitution packaging, blockable vacuum packaging, desiccant addition to inside the packaging and the like. However, these methods are disadvantageous such as inconvenient processing, increased cost, weakening of drying durability through increasing storage period.

Desiccant is one of the substances used to remove moisture from the material to be dry. Desiccants react with water, and eliminates it by a chemical action of adhering moisture, or by a physical action of water-adsorption or water-absorption, separately. Typical desiccants which remove moisture by chemical action are calcium chloride or copper sulfate, and these desiccants absorb moisture in the form of crystal water. Typical desiccants which remove moisture by physical action are silica-gel, aluminium oxide, zeolite, and the like, and these are able to accommodate a large amount of moisture in the large surface area of the material.

As one of these desiccants, silica-gel is a granular mineral material of silicon dioxide ($SiO_2$). The average pore size of silica-gel as a desiccant is 24 Å, and it has a high affinity with water molecules. Silica-gel has a property to pull moisture until 220° F. (105° C.), shows maximum activity as a desiccant in the range of 70° F.~90° F., 60~90% RH, and absorb moisture by 40% RH. It is the only approved material in the FDA (U.S.A.) which can directly come in contact with foods and medicines.

Silica-gel can absorb many organic chemical materials other than water, and has various pore sizes. The silica-gel's absorbable chemical materials in the order of absorbability are as follows: water, ammonia, alcohols, aromatics, diolefins, olefins, and paraffins.

As an another desiccant, molecular sieve is a synthetic porous aluminosilicate having strong moisture-adsorbing capacity. Unlike other desiccants, the adsorbing pores of molecular sieve are uniformed and lattice structured. The size of the adsorbing pores can be controlled. In general, molecular sieves having 3 Å, 4 Å, 5 Å, 10 Å adsorbing pores are used.

Molecular sieve can adsorb water, but emits volatile substances. In case of 3 Å, water is adsorbed and many hydrocarbons are emitted. In case of 4 Å, the adsorption capacity is superior than that of 3 Å, but emits more buthane. It can contain moisture up to 230° C. (450° F.) and can maintain up to 10% RH since it has better moisture adsorbing capacity than silica-gel. The FDA has not approved sodium aluminosilicate for direct contact with consumable items, but the use of molecular sieves is allowed in Europe for pharmaceuticals. It is expensive, but adsorption capacity is excellent, and thus it is generally used to maintain low humidity conditions.

As the other desiccant, montmorillonite (MMT) clay is prepared by drying magnesium aluminum silicate in a form of sub-bentonite. If there is not any contamination and swelling, MMT once used under low humidity condition can be re-cycled. It has shown a reverse effect of re-emission water after absorbing it. MMT performs the desiccant function in the temperature condition of 120° F. (50° C.) or less, while it emits water rather than absorbing it in temperatures above 120° F. (50° C.). Therefore, when MMT is used as a desiccant, considerations must be given to the storage and distribution conditions. In general, at the standard relative humidity at room temperature, it fully functions as a desiccant. The color of MMT particle is gray, and the purity thereof should be increased to minimize any reaction with the packaging products.

Calcium oxide (CaO) can absorb water up to 28.5 wt % of its own weight. Since CaO has excellent absorbing capacity among the desiccants, it is used when maintaining the condition of low humidity is very important. CaO absorbs moisture at a slow pace, and swells by the absorbed moisture. In case of dry-frozen food, the use of CaO is limited.

The desiccants such as CaO, zeolite, and silica-gel have been used in the way of putting one of them in a Tyvek pouch, sealing the pouch, and applying it into food packages.

The basic objectives of using desiccants are to maintain the original texture of the products and to block any microbial growth in them. In case of fruits, desiccants prevent the fruits from producing water droplets due to the water vapors of fruit transpiration by adjusting saturated humidity conditions in fruit packages.

Salts, saturated salt solution, or superabsorbent polymer can be mainly used as a desiccant, and superabsorbent polymer sheet usually is used in meat or fish products to absorb meat or fish broth produced depending on the temperature. Polyacrylate or starch graft polymer is mainly used as the sheet material. In these cases, packaging products incorporated huectant between the plastic films, such as propylene glycol (film) sealing with polyvinyl alcohol, can be used for the purpose of covering meat or fish. It also can be applied to protect electronic products or components, and metal/electrical, or electronic precision machines by preventing rust or corrosion that may occur from their contact with moisture during storage or transportation.

Desiccants are widely used to maintain the quality of food, medicine, electronic product, and the like. The desiccant is usually used as a form of small pouch, and it is packaged together with the product inside the packaging. Thus, there may be some concerns of contamination of food or of diminishing the quality of the products. There may be deficiencies in the packaging pouch, and the spilled desiccant may cause adverse effects to consumers' safety when the desiccant is used for food or medicine.

Also, the process of putting desiccant pouches into the product is inconvenient, and it is highly possible that the desiccant will produce off-flavor and/or reactants after adsorbing moisture.

Therefore, the inventors of the present invention intended to develop a functional adsorbing packaging film for moisture-sensitive products with consideration for handy uses and long lasting effect of moisture-adsorption. Various desiccants were investigated and selected for their high moisture-adsorption capabilities, and samples were prepared and analyzed in a desiccant impregnated form into the plastic films by concentration of the desiccant. Physical properties and functional adsorption effect of the impregnated film were tested.

As a result, the present invention is completed by identifying that when a film is manufactured from polyethylene resin impregnated with polyacrylic acid partial sodium salt (PAPSS) or attapulgite synthesized acrylamide (ATPGAA), it provides excellent moisture adsorbing capability and good physical properties.

The present invention also provides film with resin composition to be used conveniently and having a long lasting-adsorption capacity for packaging moisture-sensitive dried food such as laver.

SUMMARY OF THE INVENTION

The main purpose of the present invention is to provide a resin composition and its manufacturing method for a moisture absorbing film having superior capability for absorbing moisture and sustaining the effect, and also having excellent physical properties for no contamination causing to the merchandize and its handy uses.

Another purpose of the present invention is to provide a resin composition for seasoned laver packaging film having superior capability to maintain high quality of packaged seasoned laver by removing the absorbed internal moisture of the packaged film.

Following to a formulation of the present invention, it provides to a resin composition for a moisture absorbing film comprising polyethylene resin, and polyacrylic acid partial sodium salt (PAPSS) or attapulgite synthesized acrylamide (ATPGAA) as a moisture absorbent.

Polyacrylic acid partial sodium salt (PAPSS) is a superabsorbent product processed by crosslinking sodium salts and polyacrylic acid (PA). PAPSS can process absorbing activities by containing moisture in the molecular spaces formed in the molecular chains of PAPSS through the cross-linking processes.

PAPSS is the product processed by crosslinking to a lesser degree than polyacryic acid sodium salts (PASS). PASS is the product processed by crosslinking to a greater degree than PAPSS.

PAPSS is non-toxic and alkaline. PAPSS rapidly melts when it comes in contact with water directly and increases its volume. PAPSS in powder form condenses when it comes in contact with water or high humidity (FIG. 1) and it melts in water when the moisture quantity increases. It can be used at a high concentration. PAPSS has a chemical property to be distributed to various salts, and so, is used for manufacturing papers and pigments, or for plant air-controlling systems.

The structural formula of PAPSS is $C_3H_3NaO_2$, and it is used for medical appliance. When PAPSS is used for medical appliance, it can be used as anti-viral material, such as agents for preventing and treating anti-tumor and viral disease, or agent for interfering DNA synthesis of virus. Also, PAPSS is used for medical devices (implants, prosthetics) for dental clinic, and also as a component of eye drops. It is reported that moisture absorbency decreases when the proportion of cross-linked salt increases.

Attapulgite synthesized acrylamide (ATPGAA) is cross-linked material with attapulgite (ATPG) and poly acrylamide (AA). It is a hybrid product by synthesizing inorganic and organic material according to Junping Zhang (2007).

Attapulgite is classified as a clay group such as zeolite, montmorillonite (MMT), and diatomite. It consists of mainly magnesium aluminium phyllosilicate, $(Mg,Al)_2Si_4O_{10}(OH)$ $.4(H_2O)$, fuller's earth, smectite, and palygorskite.

Smectite is formulated by a lattice structure, and the lattice structured particles and moisture are combined through hydrogen bonding, and it presents in the form of gel. Palygorskite is neither expanded nor extended. Palygorskite particles are considered to be charged with the zones of + and − charges, and attapulgite is changed to the gel type in solution.

Attapulgite has already been used for paints, sealants, adhesives, catalysts, fixing agents, and binders. It is less expensive than other nano-sized clays.

Studies for attapulgite synthesized acrylamide (ATPGAA) have been conducted to apply to polymer for advanced technology. The studies identified that ATPGAA showed excellent moisture absorbing performance when it was synthesized after replacing the surface of attapulgite with ions.

This material was developed to be first applied as pot fillers of ornamental trees, and progressed to other applications as the research progressed.

Polyacrylic amide as a polymer, cannot be ionized and is one of highly swelling water-soluble synthetic polymers. It has excellent physical properties composed through cross-linking.

Through the synthesis process of saponification, the surface of synthesized ATPGAA can be improved. The synthesis process of ATPGAA according to example one is shown in FIG. 2.

According to the present invention of the resin composition for moisture absorbing film, the preferable weight ratio of moisture absorbent to total resin composition is 0.5 to 4 wt %.

According to the present invention of the resin composition for moisture absorbing film, the preferable polyethylene resin is linear low density polyethylene (LLDPE), According to the present invention of the resin composition for moisture absorbing film, preferable melting point of the polyethylene resin is lower than 180° C. It is because when the processing temperature is above 180° C., polyacrylic acid partial sodium salt can be thermally decomposited.

According to another formulation of the present invention, the present invention provides moisture absorbing film characterized for packaging when the film was manufactured following to the resin composition.

According to one other formulation of the present invention, the present invention provides a manufacturing method for moisture absorbing film characterized for packaging, which includes the processes of preparing pellets by compounding polyethylene resin and a moisture absorbent, adding further polyethylene resin to the pellets, and blow-extrusing them, wherein the moisture absorbent is chosen from polyacrylic acid partial sodium salt (PAPSS) or attapulgite synthesized acrylamide (ATPGAA).

In the step of manufacturing pellets, the preferable weight ratio of polyethylene resin to moisture absorbent is 20:1 to 20:6, and it is preferable to add polyethylene resin further to the composition in the step of blow-extrusing, so that the weight ratio of PAPSS to total resin composition is 0.5 to 4 wt %. More preferably, in the step of manufacturing pellets, the weight ratio of polyethylene resin to moisture absorbent is 9:1.

According to the present invention, the preferable grain size of the moisture absorbent is 100 to 500 mesh.

The present invention provides for manufacturing of a film having superior moisture absorbing performance and excellent physical properties.

The present invention also provides a resin composition for seasoned laver packaging film to be used for maintaining the high quality of the merchandize with good taste and tissue dryness by removing the internal moisture and offensive off-flavor in the seasoned laver packages.

DESCRIPTION OF THE PREFERRED EMBODIMENTS

Figure 1:
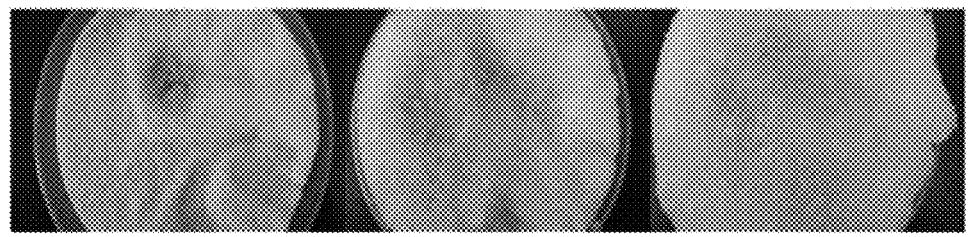
FIG. 1 depicts the swelling behavior of 5 g PAPSS, according to the addition of water 10 mL (left), 50 mL (middle), and 100 mL (right).

The present invention will be illustrated with the following examples. These examples should not be interpreted to restrict the scope of the present invention.

The present invention relates to a resin composition for a moisture absorbing film, the resin composition comprising polyethylene resin and polyacrylic acid partial sodium salt (PAPSS) or attapulgite synthesized acrylamide (ATPGAA) as a moisture absorbent.

DESCRIPTION OF THE PREFERRED EMBODIMENTS

The present invention is illustrated with the following experimental examples. These examples should not be interpreted to limit the scope of the present invention.

The present invention is related to a resin composition for moisture absorbing film, where the resin composition comprises polyethylene resin and polyacrylic acid partial sodium salt (PAPSS) or attapulgite synthesized acrylamide (ATPGAA) as a moisture absorbent.

Experimental Example 1

Analysis of Sorption-Isotherm

After comparing several absorbents for their moisture-adsorptive capacities and physical properties, experimental absorbents were selected by the standards of their adsorbing capacities of surrounding moisture or liquids and their ability to adsorb physically from the atmosphere. The selection was made to prevent problems of unexpected byproducts by chemical bindings between moisture and the absorbent when the absorbent is applied to use in food packaging.

Also, absorbents requiring minimal chemical processing were selected after identifying their manufacturing processes to minimize the problems that may occur when they are applied for food packaging.

The substances were selected by taking into account the adoptability of processing when it is applied to the film, the possibility of processing to optimum particle size for mixing with the film, the cost in mass production, and the commercial availability.

Selected materials based on the above referenced standards are in Table 1.

TABLE 1

The selected materials with standards

| | The standard for selecting materials | | | | |
|---|---|---|---|---|---|
| | Known Absorbency | Physical absorbing behavior | Heavy chemical treatment | Economical efficiency | Process properties |
| Zeolite | ○ | ○ | — | ○ | ○ |
| Diatomite (Power Dry) | ○ | ○ | — | ○ | |
| Montmorillonite (Closite ®Na+) | ○ | ○ | ○ | ○ | ○ |
| Montinorillonite (Closite ®20A) | ○ | ○ | ○ | ○ | ○ |
| Montmorillonite (Closite ®30B) | ○ | ○ | ○ | ○ | ○ |
| PAPSS | ○ | ○ | — | ○ | ○ |
| ATPG | — | ○ | — | ○ | ○ |
| ATPGAA | ○ | ○ | — | — | ○ |
| Silica-gel | ○ | ○ | — | ○ | — |

* PAPSS: Polyacrylic acid partial sodium salt
* ATPG: Attapulgite
* ATPGAA: Attapulgite acrylamide (synthesized)

1-1. Evaluation of Sorption Capacity

Sorption capacity evaluation for total seven candidate samples including silica-gel as a control was conducted to determine their moisture absorption capacity.

Zeolite was obtained from AK Chem Tech. Co. (APNC20, Dae-Jeon, Korea), and diatomaceous earth (Powder-Dry for the trade name) was obtained from Sae-Nam materials Co. (Kyung-Nam, Korea). Montmorillonite (MMT) was supplied from Southern clay Co. (Gonzales, Tex., USA) and Closite Na+ was used from pre-experiment of moisture absorbency among these MMT types.

Figure 2:
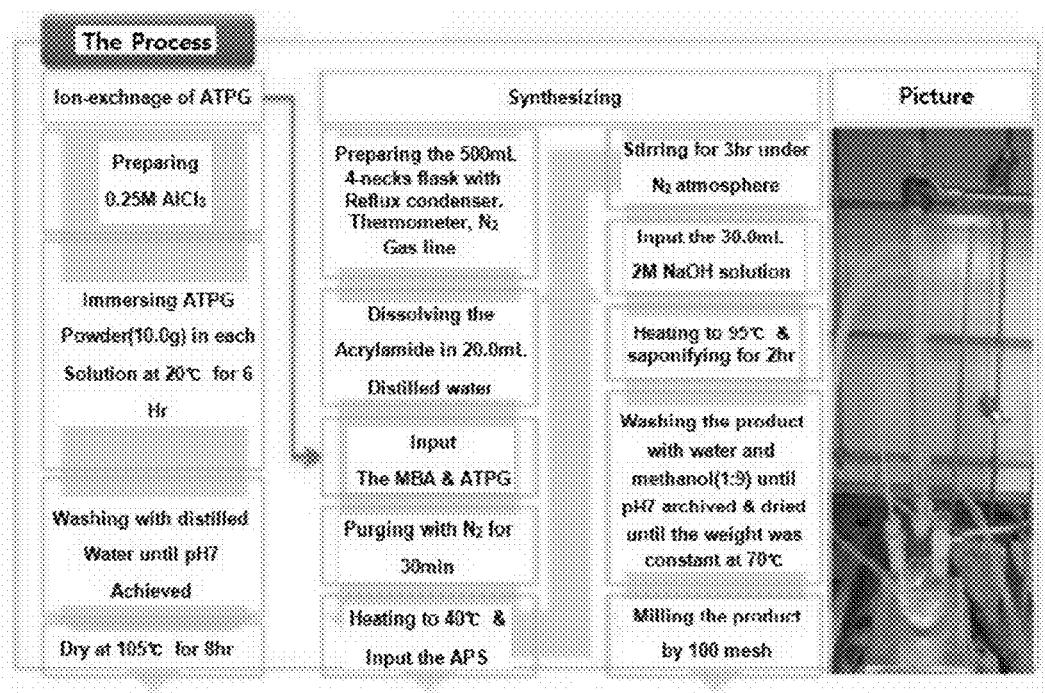
FIG. 2 depicts the synthesizing procedure for ATPGAA.

Polyacrylic acid partial sodium salt (PAPSS)(lightly cross linked) was obtained from Aldrich Co., (USA) and attapulgite (ATPG) was obtained from BASF Co. (Korea). Attapulgite synthesized acrylamide (ATPGAA) was synthesized at the laboratory and the synthesis procedure thereof was shown in FIG. 2. Silica-gel was obtained from Duk-san Co.

Zeolite is the substance of which has been improved its gas adsorption capacity by replacing anion on the surface with cation. Power dry is one of diatomaceous earths obtained after calcinating at 800° C. and then precipitating and drying in CaO. Closite Na+ is a natural MMT, and PAPSS is a substance contained in the middle layer of diapers. ATPG is an inorganic substance of hydrated alumina magnesium and has adsorption capacity. ATGAA is a substance capable of super-adsorption. Finally silica-gel is a representative adsorption substance being applied for food packaging, and it was used as a control in the present experimental examples.

The sorption-isotherm experiments were carried out at different humidity conditions. Each pretreated substance was moved to a disposable AL dish and weighed at 5 g using digital balance (Sartorius Ag Gottingen CP224S, ±0.0001 g). The initial weight of substance is 5 g, and the samples were placed at 20° C., 30° C., 40° C. for 19 days. The samples were opened and each sample was weighed to evaluate the weight changes after 19 days. The final weight (Wf-19 days after) minus initial weight (Wi-5 g) equals amount of water adsorbed from the atmosphere for 19 days. The ($W_f - W_i$) divided by the initial weight is calculated as the amount of water adsorbed by the sample per 1 g.

The calculated moisture sorption of sample per 1 g is shown in Equation 1.

$$Q_{eq}(g/g) = \frac{W_f W_i}{W_i} \qquad [\text{Equation 1}]$$

Figure 3:
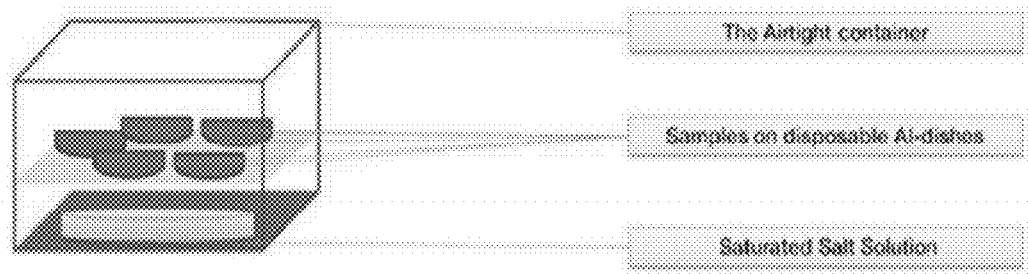
FIG. 3 depicts the experimental procedure.

The experiment was conducted in six air-tight containers prepared to equilibrate fixed and constant relative humidity. The air-tight containers were plastic made and open-and-close capable, and the conditions of internal system are shown in FIG. 3. The relative humidity was adjusted with a series of saturated salt solutions.

The salts used in the experiments were KCl, $NH_4NO_2$, $Na_2Cr_2O_7 \cdot H_2O$, $CaCl_2$, NaOH and $K_2SO_4$, and these salts were capable to compose 30%, 40%, 50%, 60%, 70%, and 80% relative humidity (RH). There could be RH discrepancies caused by the different storage temperatures of these saturated salt solutions. Datalogger sensor (SK-Sato, SK-L200THII, Tokyo, Japan) was used to measure the actual RH in the internal systems as shown by FIG. 3. The actual RH measured by temperature was shown in Table 2.

TABLE 2

| type of salts | Water Activity (aw) | | |
|---|---|---|---|
| | 20° C. | 30° C. | 40° C. |
| $K_2SO_4$ | 0.309 | 0.321 | 0.340 |
| KCl | 0.384 | 0.381 | 0.386 |
| $NH_4NO_3$ | 0.514 | 0.558 | 0.614 |
| $Na_4Cr_2O_7 \cdot H_2O$ | 0.610 | 0.729 | 0.866 |
| $CaCl_2$ | 0.731 | 0.821 | 0.929 |
| NaOH | 0.879 | 0.934 | 0.977 |

Only the temperature was adjusted by using a large constant humidity and temperature chamber. Three conditions, 20° C.±0.5° C., 30° C.±0.5° C., 40° C.±0.5° C. were set by assuming room temperature, outside temperature in summer, and storage warehouse temperature in summer, respectively. These conditions describe the storage environments of the dry products to be applied finally. Temperature effect on the adsorption capacity of the substances was investigated.

1-1. Results and Interpretation

Figure 4:
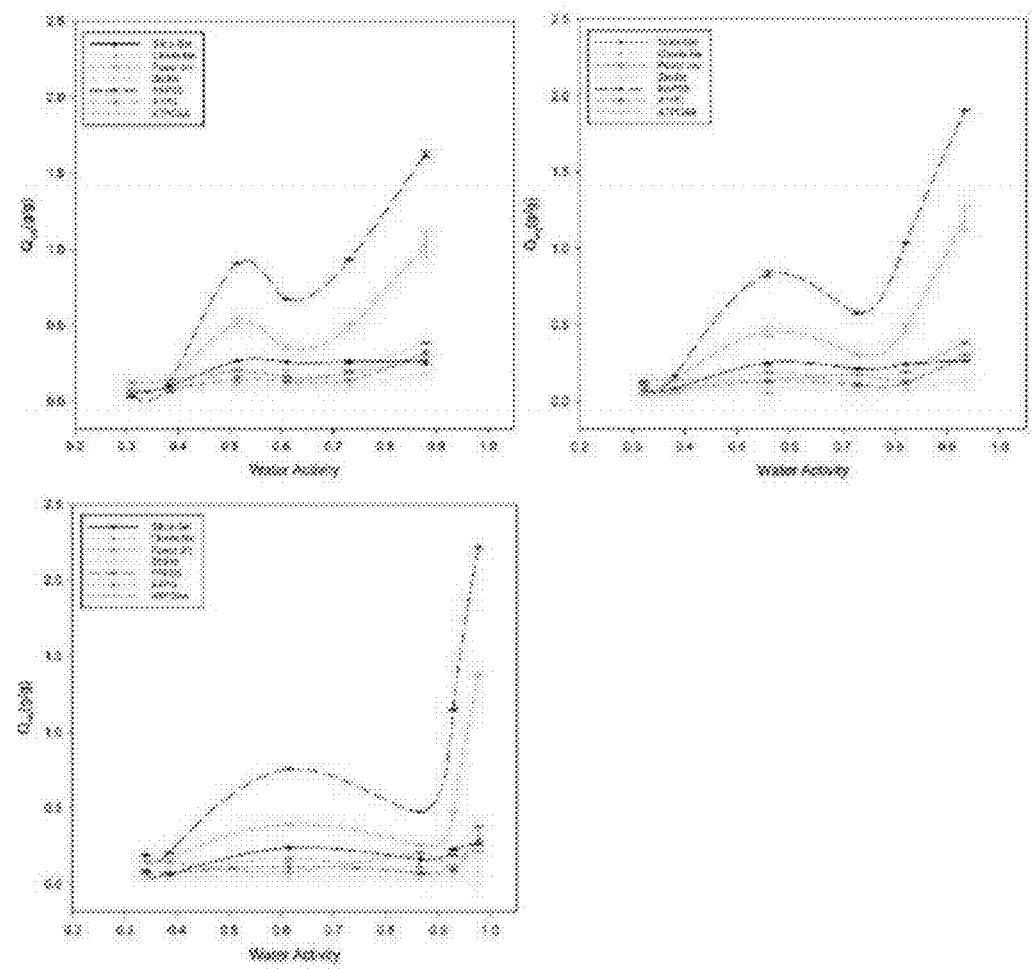
FIG. 4 depicts the sorption behavior of sample materials at 20° C., 30° C., 40° C.

Each quantity of moisture absorption by selected material was obtained by the above equation 1, and the results were plotted in FIG. 4.

PAPSS showed the highest sorption capacity among the seven (7) materials as shown in FIG. 4, and ATPGAA was next. Each material sorption capacity by temperature are shown in Tables 3 and Table 4.

TABLE 3

| tem.(° C.) | aw | Qeq(g/g) Silica-gel | zeolite | Power Dry | Closite ®Na+ |
|---|---|---|---|---|---|
| 20° C. | 0.3090 | 0.0589 ± 0.0206 | 0.0527 ± 0.0115 | 0.1206 ± 0.0092 | 0.0793 ± 0.0008 |
| | 0.3840 | 0.1007 ± 0.0004 | 0.0620 ± 0.0009 | 0.1371 ± 0.0027 | 0.0804 ± 0.0042 |
| | 0.5140 | 0.2653 ± 0.0003 | 0.2066 ± 0.0019 | 0.2000 ± 0.0037 | 0.1073 ± 0.0034 |
| | 0.6100 | 0.2570 ± 0.0013 | 0.1595 ± 0.0020 | 0.1529 ± 0.0503 | 0.0984 ± 0.0038 |
| | 0.7310 | 0.2580 ± 0.0099 | 0.1983 ± 0.0032 | 0.1798 ± 0.0026 | 0.1067 ± 0.0050 |
| | 0.8790 | 0.2604 ± 0.0212 | 0.3848 ± 0.0081 | 0.2779 ± 0.0043 | 0.1785 ± 0.0093 |
| 30° C. | 0.3210 | 0.0709 ± 0.0010 | 0.0442 ± 0.0006 | 0.1361 ± 0.0036 | 0.0556 ± 0.0008 |
| | 0.3810 | 0.0837 ± 0.0005 | 0.0557 ± 0.0008 | 0.1417 ± 0.0068 | 0.0611 ± 0.0005 |
| | 0.5580 | 0.2528 ± 0.0013 | 0.1881 ± 0.0022 | 0.1425 ± 0.0869 | 0.0824 ± 0.0007 |
| | 0.7294 | 0.2126 ± 0.0028 | 0.1147 ± 0.0067 | 0.1746 ± 0.0051 | 0.0684 ± 0.0023 |
| | 0.8210 | 0.2430 ± 0.0043 | 0.1940 ± 0.0015 | 0.1361 ± 0.0039 | 0.0813 ± 0.0035 |
| | 0.9341 | 0.2630 ± 0.0015 | 0.3830 ± 0.0086 | 0.2762 ± 0.0049 | 0.1337 ± 0.0058 |
| 40° C. | 0.3397 | 0.0841 ± 0.0092 | 0.0350 ± 0.0010 | 0.1531 ± 0.0017 | 0.0295 ± 0.0034 |
| | 0.3856 | 0.0649 ± 0.0027 | 0.0487 ± 0.0005 | 0.1467 ± 0.0028 | 0.0398 ± 0.0077 |
| | 0.6140 | 0.2391 ± 0.0037 | 0.1678 ± 0.0013 | 0.0792 ± 0.0044 | 0.0551 ± 0.0313 |
| | 0.8658 | 0.1638 ± 0.0503 | 0.0653 ± 0.0028 | 0.1984 ± 0.0012 | 0.0354 ± 0.0136 |
| | 0.9292 | 0.2264 ± 0.0026 | 0.1894 ± 0.0043 | 0.0881 ± 0.0064 | 0.0534 ± 0.0239 |
| | .9774 | 0.2658 ± 0.0043 | 0.3811 ± 0.0015 | 0.2743 ± 0.0054 | 0.0844 ± 0.0842 |

TABLE 4

| tem.(° C.) | aw | Qeq(g/g) PAPSS | ATPG | ATPGAA |
|---|---|---|---|---|
| 20° C. | 0.3090 | 0.0458 ± 0.0213 | 0.0671 ± 0.0156 | 0.0667 ± 0.0034 |
| | 0.3840 | 0.1301 ± 0.0122 | 0.0824 ± 0.0066 | 0.1241 ± 0.0077 |
| | 0.5140 | 0.9083 ± 0.0018 | 0.1431 ± 0.0186 | 0.5150 ± 0.0313 |
| | 0.6100 | 0.6711 ± 0.0011 | 0.1305 ± 0.0042 | 0.3502 ± 0.0136 |
| | 0.7310 | 0.9347 ± 0.0043 | 0.1369 ± 0.0068 | 0.4874 ± 0.0239 |
| | 0.8790 | 0.6202 ± 0.0202 | 0.3186 ± 0.0157 | 0.0333 ± 0.0842 |
| 30° C. | 0.3210 | 0.1147 ± 0.0101 | 0.0707 ± 0.0017 | 0.1091 ± 0.0068 |
| | 0.3810 | 0.1676 ± 0.0001 | 0.0800 ± 0.0028 | 0.1442 ± 0.0083 |
| | 0.5580 | 0.8354 ± 0.0172 | 0.1284 ± 0.0044 | 0.4569 ± 0.0323 |
| | 0.7294 | 0.5762 ± 0.0016 | 0.1053 ± 0.0012 | 0.3045 ± 0.0084 |
| | 0.8210 | 0.0363 ± 0.0023 | 0.1192 ± 0.0064 | 0.4799 ± 0.0215 |
| | 0.9341 | 0.9057 ± 0.0009 | 0.3056 ± 0.0054 | 0.1966 ± 0.0811 |
| 40° C. | 0.3397 | 0.1906 ± 0.0036 | 0.0747 ± 0.0068 | 0.1557 ± 0.0006 |
| | 0.3856 | 0.2089 ± 0.0068 | 0.0772 ± 0.0083 | 0.1663 ± 0.0008 |
| | 0.6140 | 0.7551 ± 0.0087 | 0.1123 ± 0.0323 | 0.3929 ± 0.0022 |
| | 0.8658 | 0.4717 ± 0.0051 | 0.0777 ± 0.0084 | 0.2542 ± 0.0067 |
| | 0.9292 | 0.1480 ± 0.0039 | 0.0996 ± 0.0215 | 0.4717 ± 0.0015 |
| | 0.9974 | 0.2198 ± 0.0049 | 0.2914 ± 0.0811 | 0.3762 ± 0.0086 |

The above values represent the values under the experimental environment. A mathematical model was used to estimate the values under non-laboratory environment. This is an existing way used in the interpretation of sorption isotherm curves. The values under the non-laboratory and other conditioned environments were estimated by finding the most appropriate model in the existing mathematical models. The mathematical models used are shown in Table 5.

TABLE 5

| Name of the model | Model equation | reference |
|---|---|---|
| Chang-Prost | $X_e = \frac{1}{a}\ln\left[\frac{-(T+e)}{e}\ln a_w\right]$ | Prost et al. (1976) |
| Modified Halsey | $X_e = \left[\frac{\exp(a-bT)}{-\ln a_w}\right]^{1/e}$ | Iglesias and Chirife (1976) |
| GAB | $X_e = \frac{m_0 C_0 k a_w}{(1-ka_w)(1-ka_w+kC_0 a_w)}$ | Van der berg and Briun (1981) |

TABLE 5-continued

| Name of the model | Model equation | reference |
|---|---|---|
| Modified Oswin | $X_e = (a-bT)\left(\frac{a_w}{1-a_w}\right)^e$ | Chen (2000) |
| Henderson-Thompson | $X_e = \left[\frac{\ln(1-a_w)}{-a(T+e)}\right]^{1/b}$ | Thompson et al. (1968) |
| White and Eiring | $X_e = \frac{1}{a+ba_w}$ | Castillo et al. (2003) |
| Peleg | $X_e = a(a_w)^b + c(a_w)^c$ | Peleg (1993) |
| Smith | $X_e = a - b(\ln(1-a_w))$ | Smith (1947) |
| Courie | $X_e = \exp(a+ba_w)$ | Castillo et al. (2003) |

*Xe: the same means Qeq
*a, b, c, is constant.

Modeling criteria were determined by the basis of coefficient of correlation factor, $R^2$ value, and the selected model and the constant values expressed in the equation for each material were shown in Table 6.

TABLE 6

| temp.(° C.) | Materials | The fittest model | $R^2$ | Constant value a | b | c |
|---|---|---|---|---|---|---|
| 20° C. | silica-gel | Peleg | 0.91 | 1.28 | −0.82 | −1.01 |
| | ClositeNa+ | Chunge-Pfost | 0.89 | 7.09 | 0.00 | 511.34 |
| | Power Dry | Modified Halsey | 0.82 | 973.82 | 3.34 | 3.00 |
| | zeolite | Peleg | 0.94 | 0.28 | 9.51 | 0.10 |
| | PAPSS | Chung-Pfost | 0.89 | 1.48 | 0.00 | 420.54 |
| | ATPG | Modified Halsey | 0.93 | −890.99 | −3.03 | 1.53 |
| | ATPGAA | Smith | 0.89 | −0.07 | 0.51 | — |
| 30° C. | silica-gel | Peleg | 0.89 | 1.10 | −0.63 | −0.84 |
| | ClositeNa+ | Modified Oswin | 0.88 | 52.71 | 0.17 | 0.53 |
| | Power Dry | Modified Halsey | 0.73 | −5.28 | 0.01 | 3.83 |
| | zeolite | Peleg | 0.86 | 0.16 | 13.37 | 0.07 |
| | PAPSS | Modified Oswin | 0.91 | −55.71 | −0.19 | 0.58 |
| | ATPG | Peleg | 0.96 | 0.73 | 18.87 | 0.10 |
| | ATPGAA | Modified Halsey | 0.93 | −15.29 | −0.04 | 1.37 |

TABLE 6-continued

| temp.(° C.) | Materials | The fittest model | $R^2$ | Constant value a | b | c |
|---|---|---|---|---|---|---|
| 40° C. | silica-gel | Peleg | 0.74 | −0.01 | −2.48 | 0.24 |
| | ClositeNa+ | Modified Halsey | 0.83 | 4309.04 | 13.78 | 1.84 |
| | Power Dry | Peleg | 0.60 | 48.50 | 258.27 | 0.14 |
| | zeolite | Peleg | 0.81 | 0.08 | 28.82 | 0.04 |
| | PAPSS | Modified Halsey | 0.92 | −2.64 | 0.00 | 1.73 |
| | ATPG | Peleg | 0.98 | 0.82 | 61.67 | 0.09 |
| | ATPGAA | Peleg | 0.97 | 2.49 | 36.68 | 0.30 |

By using the above Table 6, the amount of adsorbed water for the applied material at the corresponding temperature can be estimated by the probability of $R^2$ value when the major temperatures of applied materials are known.

PAPSS and ATPGAA showed excellent moisture absorbencies among the seven (7) absorbents. PAPSS and ATPGAA showed about six (6) and four (4) times superior absorbency compared to the control, silica-gel, respectively.

The modeling used in the present experimental examples deduced the logical method for estimating the absorbencies of the substances in the full range of relative humidity and the basis for determining the amount of substances to be applied for each product. The films were actually manufactured based on the above results.

Experimental Example 2

Analysis of Film Applicability by Manufacturing Sheet

Two materials, PAPSS and ATPGAA, were selected through the above experimental example 1. A study was conducted to apply them in packaging. First, the sheet was manufactured using a universal plastic, LDPE resin, and evaluation analysis for physical properties and distribution of material was conducted. The possibility of developing the film was evaluated by manufacturing the sheet of intermediate product towards to the final product of functional film.

2-1. Manufacturing Sheet and Analysis

The sheet was manufactured by using hot press at 200° C. and 10 MPa, temperature and pressure conditions, respectively. LDPE resin for the sheet and the functional materials, PAPSS and ATPGAA selected through the experimental example 1, were used in the experiment. The particle size of the two functional materials was adjusted to 1000 μm or less to distribute evenly in the LDPE resin.

In order to determine the quantity of functional material in manufacturing the resin sheet, one of foods including absorbents, dry laver, was chosen as a standard base. Based on the proper amount of commercially available absorbent, silica-gel, the needed quantities of PAPSS and ATPGAA were derived by comparing the results of the experiment. The weight classification of dry laver is shown in Table 7.

TABLE 7

| | A company product | B company product | C company product | D company product |
|---|---|---|---|---|
| total weight | 15.51 g | 14.10 g | 13.47 g | 12.12 g |
| film weight | 3.1 g | 3.17 g | 3.16 g | 3.12 g |
| tray weight | 4.21 g | 4.27 g | 4.25 g | 4.50 g |
| product weight | 5 g | 5 g | 5 g | 5 g |
| Absorbent(silica-gel) weight | 8.2 g | 6.66 g | 6.06 g | 4.5 g |

The average amount of silica-gel was 6 g according to the data shown in the Table 7, and thus the amount of PAPSS and ATPGAA was calculated as 1.7 g and 2.45 g, respectively. The amount of material for manufacturing the sheet was determined under the assumption of 100% efficiency of the hygroscopic substances.

A dispersant was used to distribute the two powdery functional materials into the resin layers. Triton X-100 was used as a dispersant for the experiment as it is usually used to distribute powdery solid materials.

To evaluate the degree of dispersion by the amount of dispersant, each sheet was manufactured, and the degree of distribution was identified by using an electron microscope.

By using a TA.XT texture analyzer (stable Micro System Ltd, UK), the physical properties of the prepared sheet were measured to evaluate the tensile strength and elongation (%). A load cell weighing 50 kg was used, and the average thickness of the sheet was 1.14±0.5 mm, and the sample size was horizontally 1 cm and vertically 10 cm. Five (5) samples per one experimental group were manufactured and measured.

2-2. Results and Interpretation

The dispersion effect of Triton X-100 was visually confirmed prior to manufacturing the sheet, and the amount of dispersant was checked to prevent the dispersant from flowing out during the hot-pressing process.

The weight ratios of dispersant used per 1 g PAPSS was 1.5 times, 2.0 times and 2.5 times.

The reason for using the dispersant in preparing the sheet is not only to have dispersing effect of functional materials, but also to eliminate aluminum foil (Al-foil) easily. The aluminum foil was used to support the experimental materials during the hot-press processes. The weight ratios of 2.0× and 2.5× for amount of dispersants to 1 g PAPSS were effective.

The specific region of the sheet was selected and investigated by electron microscopy at 2,400×. The results of the sheets used 2.5× and 2.0× dispersants were shown in FIG. 5, and FIG. 6, respectively.

Figure 5:
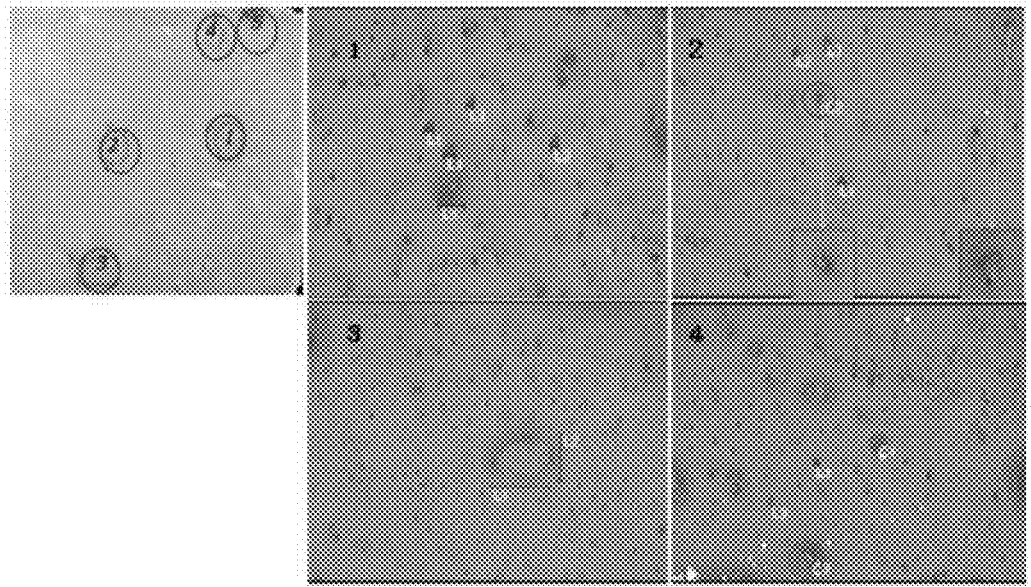
FIG. 5 depicts the pictures showing the distribution of PAPSS particles in the sheet made with 2.5× dispersing agent (Triton X-100).

The parts indicated with numbers in FIG. 5 were expanded by electron microscopy and were shown in the right photos. The portions shown in black in common were interpreted as the portions of PAPSS or dispersant aggregated. The L1~L5 in number section was the model and size of the material dispersed, and the average size of the parts except L5 was 7.09 μm. In number section, black spots around C2 were shown and the center of the spot was donut-shaped.

That's a scratch form occurred in the press processing. The material not dispersed and surrounding the spherical resin formed a sheet by dissolving. The form shown in the number section was observed in the number 3 and 4 sections, and so it can be regarded as a feature of press processing. Overall dispersion was made in good condition. However, it can be interpreted that partially no dispersion was made since the black spot of PAPSS and aggregation by the liquid dispersant occurred.

Figure 6:
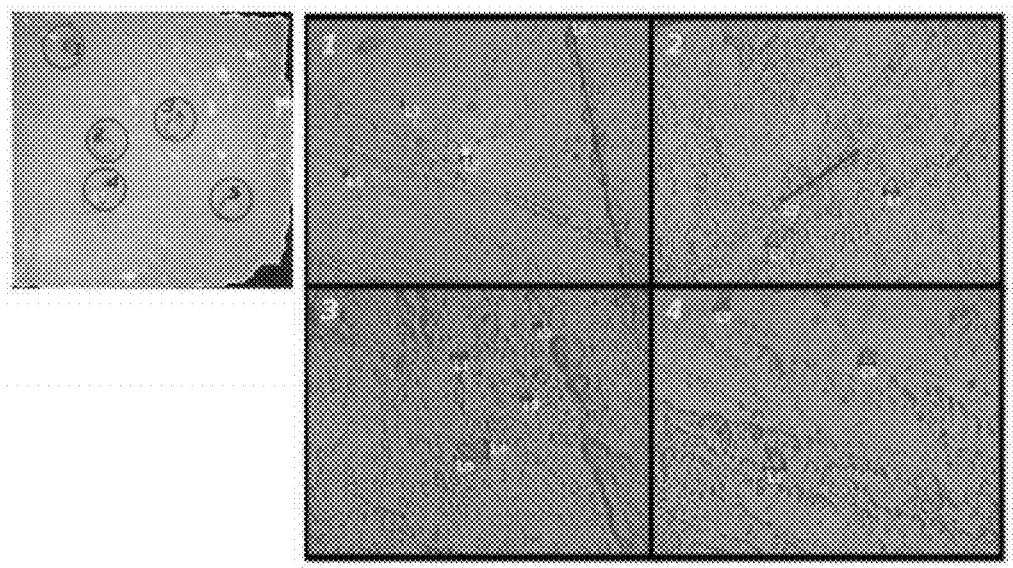
FIG. 6 depicts the pictures showing the distribution of PAPSS particles in the sheet made with 2.0× dispersing agent (Triton X-100).

As shown in the electron microscope magnified photo of FIG. 6, the form embedded as in FIG. 5 was hardly found, but a wave pattern was observed. It can be interpreted that the wave pattern occurred when the dispersed quantity was low since a small amount of dispersant was dispersed by pressure but the dispersant still remained internally in the sheet. It was concluded that the material was within the wave pattern.

As a result of the investigation through electron microscopy, attempts to disperse material by using a liquid dispersant seemed to be difficult due to the aggregation occurred by contacting the liquid dispersant with powder and due to the problems in manufacturing the sheet. So it was concluded that the mechanical dispersion should be used.

Figure 7:
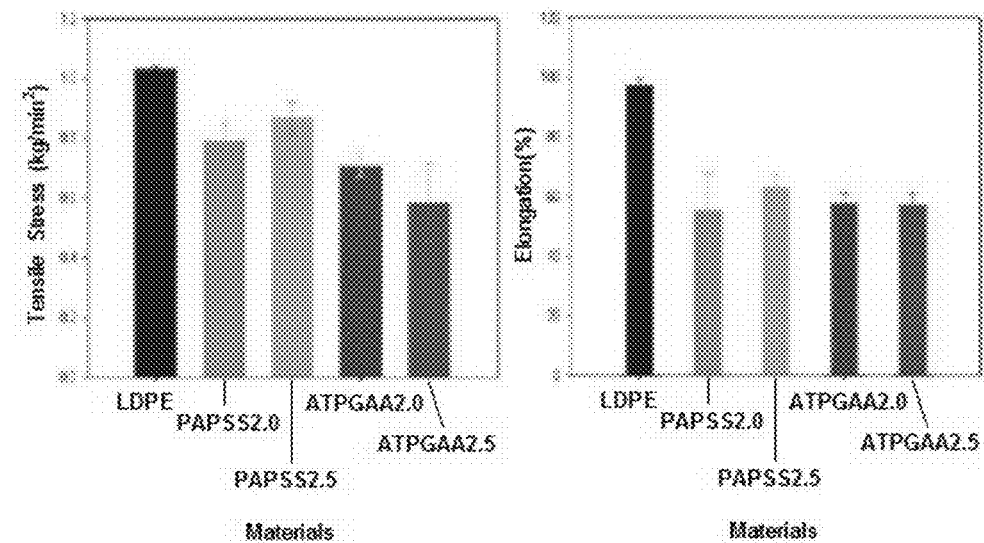
FIG. 7 depicts the mechanical properties of the sheet.

Experimental results of physical properties of the sheet were shown in Table 8 and FIG. 7.

TABLE 8

| | max tensile strength (%) | elongation rate (%) | stress (kg/ml) | average elongation rate (%) | average tensile stress | comparision (%) | |
|---|---|---|---|---|---|---|---|
| LDPE | 9.7 | 97.647 | 1.026316 | 97.2868 | 1.031579 | — | |
| | 9.9 | 101.486 | 1.026316 | | | | |
| | 10.1 | 96.687 | 1.052632 | | | | |
| | 9.7 | 93.927 | 1.026316 | | | | |
| | 9.7 | 96.687 | 1.026316 | | | | |
| X 2.0 (PAPSS) | 8.2 | 49.779 | 0.723 | 55.4324 | 0.7922 | 56.98 | 76.94 |
| | 10 | 77.952 | 0.881 | | | | |
| | 8.7 | 50.155 | 0.761 | | | | |
| | 8.9 | 49.638 | 0.777 | | | | |
| | 9.3 | 49.638 | 0.819 | | | | |
| X 2.5 (PAPSS) | 10.2 | 63.671 | 0.897 | 63.3452 | 0.868 | 65.11 | 84.14 |
| | 9.3 | 57.342 | 0.816 | | | | |
| | 10.2 | 66.661 | 0.897 | | | | |
| | 10.5 | 67.781 | 0.922 | | | | |
| | 9.2 | 61.271 | 0.808 | | | | |
| X 2.0 (ATPGAA) | 8.3 | 63.491 | 0.724 | 57.5698 | 0.7078 | 59.18 | 68.61 |
| | 7.8 | 57.302 | 0.685 | | | | |
| | 8 | 55.772 | 0.7 | | | | |
| | 8.7 | 55.842 | 0.764 | | | | |
| | 7.6 | 55.442 | 0.666 | | | | |
| X 2.5 (ATPGAA) | 6.2 | 56.912 | 0.54 | 57.1898 | 0.5848 | 58.74 | 56.69 |
| | 4.4 | 53.512 | 0.385 | | | | |
| | 6.7 | 54.732 | 0.59 | | | | |
| | 8.3 | 63.491 | 0.724 | | | | |
| | 7.8 | 57.302 | 0.885 | | | | |

Comparing the results of each sample based on the data of LDPE, the elongation rate showed from 50% to 60%, and the average tensile strength represented 70% on average. After the analysis, the sheet cut was investigated. The cutting positions were each different, but it was commonly observed that the cut occurred in the portion which the material was aggregated. Comparison depending on the amount of dispersant was observed in PAPSS, and when the amount of dispersant was high, it showed excellent results in terms of elongation and tensile strength. It indicates that the dispersion affects physical properties of film or sheet when physical mixings are conducted.

Experimental Example 3

Film Manufacturing 3-1. Film Manufacturing

As a result of experimental example of manufacturing sheets, the dispersion using a liquid dispersant was ineffective due to the aggregation that occurred simultaneously when the powdery functional materials came into contact. Therefore, a mechanical dispersion method was selected. Materials were mechanically mixed with linear low density polyethylene by compounding until pellets were obtained. After the first dispersion of compounding to obtain the pellets, second dispersion through the twin-screw extrusion of the film was carried out.

Compounding was conducted by twin-screw extrusion (NIP Co., Wonju, Korea), and Hanwha 3126 (LLDPE for film) was used as a resin (Hanwha chemical Co., Seoul, Korea). The moisture absorbing materials, PAPSS and ATP-GAA were ground to 100 mesh particles using sieves to minimize the influence of physical properties by its particle size when manufacturing the film.

The weight ratio of functional materials, PAPSS and ATP-GAA to the pellet was adjusted to 10%. The temperature of twin screw extruder were set at 150° C. for cylinder 1; 150° C. for cylinder 2; 160° C. for cylinder 3; 170° C. for adapter; 170° C. for carrier; 170° C. for die 1; 170° C. for die 2, under 40 rpm velocity of the extrude kneader.

Pellets added with 10% functional material was manufactured to 0.7 mm thick film using a blow extrusion machine (ARTS film Co., Yang-san, Korea).

Figure 8:
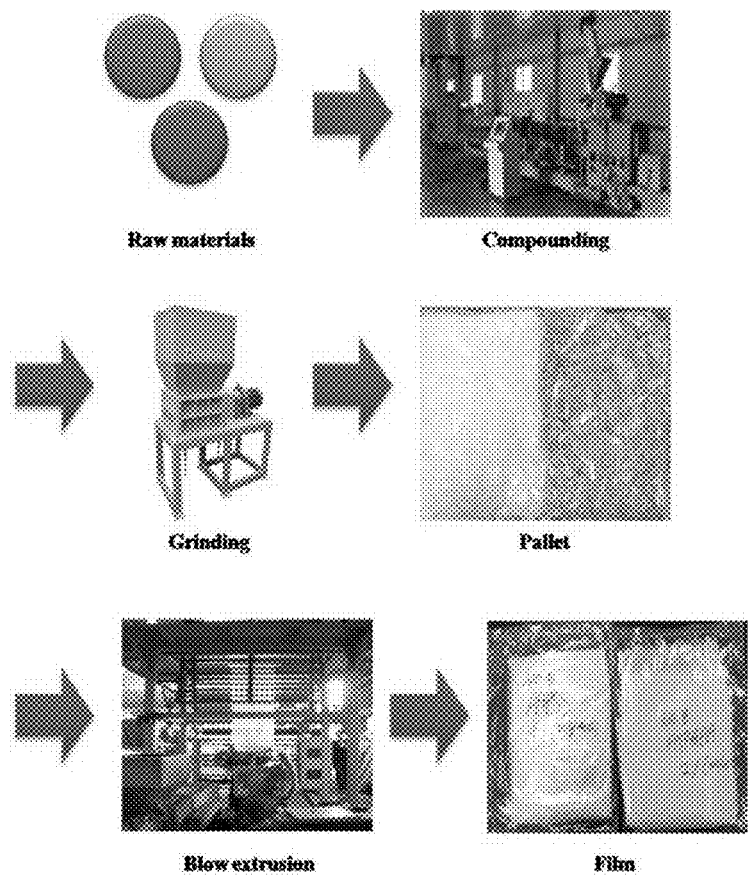
FIG. 8 depicts the flow chart showing the manufacturing procedures for the packaging film of present invention.

A total of 9 films including LLDPE, as a control, were manufactured at PAPSS and ATPGAA impregnation levels of 0.5%, 1%, 2% and 4% weight ratio (FIG. 8).

The film weights are listed in Table 9.

TABLE 9

| | content(%) | adsorbent(kg) | | LLDPE(kg) | total(%) |
|---|---|---|---|---|---|
| sample 1 | 0 | — | | 10 | 10 |
| sample 2 | 0.05 | 0.5 | PAPSS | 9.5 | 10 |
| sample 3 | 1 | 1 | | 8 | 10 |
| sample 4 | 2 | 2 | | 8 | 10 |
| sample 5 | 4 | 4 | | 6 | 10 |
| sample 6 | 0.05 | 0.5 | ATPGAA | 9.5 | 10 |
| sample 7 | 1 | 1 | | 9 | 10 |
| sample 8 | 2 | 2 | | 8 | 10 |
| sample 9 | 4 | 4 | | 6 | 10 |

In the manufacturing procedures, samples 2 to 5 comprising PAPSS showed foaming tendency and PAPSS foamed at 160° C. It was assumed that the foaming occurred as a result of thermal decomposition of PAPSS. Whereas, when the sheet was manufactured by using hot press in the experimental example 2, no thermal decomposition phenomenon occurred when exposed at 200° C. for 5 minutes.

It is assumed that such phenomenon occurred due to the continuous thermal pressure stresses by the extruder in the manufacturing processes. On the other hand, ATPGAA appeared to be stable against the heat since it was a composite material of clay and polymer. It can be concluded that ATPGAA has the characteristics of thermal stability and stiffness of inorganic material with organic functionality as a hybrid material.

3-2. Evaluation of the Degree of Film Dispersion

The films of the above experimental example 3-1 were cut into specimens of 0.25 m² area and 0.07 mm thickness to evaluate the distribution degree of films (approximately 1 g of weight basis). The evaluation and comparison was made by measuring the initial weight of the film specimen and the weight of each specimen measured after the dispersions were conducted. The weight of each specimen was calculated under the assumption that 100% distribution was achieved. Results are shown in Table 10.

TABLE 10

| sample | film weight(g)/ specimen | predicted adsorbent weight (g) |
| --- | --- | --- |
| LLDPE(control) | 1.159 ± 0.074 | — |
| 0.5% PAPSS | 1.145 ± 0.092 | 0.006 ± 0.004 |
| 1% PAPSS | 1.396 ± 0.139 | 0.014 ± 0.001 |
| 2% PAPSS | 1.411 ± 0.141 | 0.028 ± 0.003 |
| 4% PAPSS | 1.188 ± 0.057 | 0.048 ± 0.002 |
| 0.5% ATPGAA | 1.220 ± 0.067 | 0.006 ± 0.002 |
| 1% ATPGAA | 1.134 ± 0.064 | 0.011 ± 0.001 |
| 2% ATPGAA | 1.149 ± 0.043 | 0.023 ± 0.001 |
| 4% ATPGAA | 1.120 ± 0.046 | 0.045 ± 0.002 |

The degree of dispersion of the material can be predicted by the results of Table 10. When assessed based on the amount of 0.5% absorbent material, the amount of functional material in the specimen was more than the amount predicted. So, it was predicted that the functional material was well-dispersed in the manufactured films by comparing the appearance of manufactured films with each other.

In the comparison of dispersion functionality by the amount of ATPGAA and PAPSS, the relative difference between the amount of ATPGAA and the predictive amount was smaller than that of PAPSS, and thus ATPGAA was considered to have better dispersion functionality than PAPSS. In the difference of film dispersion functionality of the material, it was considered that the ATPGAA difference was caused in the manufacturing film processes by its polymer-based material characteristic unlike the thermal decomposition foaming properties of PAPSS at 160° C., if same conditions were given. The viscosity of LLDPE solution was increased by the thermal decomposition and foaming of PAPSS from the viscosity of LLDPE solid particles through the mechanical distribution processes. The increased viscosity was considered as one of barriers against the film distribution.

3-3. Evaluation of the Film Sorption-Isotherm

The film samples of experimental example 3-1 above was cut into each specimen size of 10 cm of width by 25 cm of length, and evaluated the sorption-isotherm using the same experimental method as in the experimental example 1-1. The temperature was 20° C., and the duration period was 10 days. The other conditions were the same as the experimental example 1-1.

Under the assumption that the absorbent was distributed 100% in the film, the amount of material was calculated (equation 2 below). The sorption-isotherm of the film was measured by the calculation of dividing the difference between the initial weight and final weight by the amount of the material. Results are shown in Table 11 and FIG. 9.

$$Q_{eq}(g/g) = \frac{W_f W_i}{W_{absorbent}} \quad \text{[Equation 2]}$$

TABLE 11

| | Qeq(g/g) | | | | |
| --- | --- | --- | --- | --- | --- |
| % RH | LLDPE | 0.5% PAPSS | 1% PAPSS | 2% PAPSS | 4% PAPSS |
| 0.309 | 0 | 0.003 ± 0.005 | 0.010 ± 0.004 | 0.008 ± 0.002 | 0.010 ± 0.002 |
| 0.384 | 0 | 0.014 ± 0.007 | 0.037 ± 0.007 | 0.029 ± 0.002 | 0.038 ± 0.004 |
| 0.514 | 0 | 0.156 ± 0.018 | 0.271 ± 0.017 | 0.254 ± 0.039 | 0.300 ± 0.017 |
| 0.610 | 0 | 0.141 ± 0.013 | 0.201 ± 0.014 | 0.219 ± 0.026 | 0.267 ± 0.017 |
| 0.731 | 0 | 0.222 ± 0.020 | 0.251 ± 0.016 | 0.317 ± 0.032 | 0.338 ± 0.007 |
| 0.879 | 0 | 0.327 ± 0.005 | 0.456 ± 0.031 | 0.504 ± 0.060 | 0.542 ± 0.036 |

| | Qeq(g/g) | | | | |
| --- | --- | --- | --- | --- | --- |
| % RH | LLDPE | 0.5% ATPGAA | 1% ATPGAA | 2% ATPGAA | 4% ATPGAA |
| 0.309 | 0 | 0.003 ± 0.005 | 0.016 ± 0.004 | 0.014 ± 0.001 | 0.017 ± 0.003 |
| 0.384 | 0 | 0.017 ± 0.008 | 0.066 ± 0.015 | 0.054 ± 0.003 | 0.058 ± 0.005 |
| 0.514 | 0 | 0.198 ± 0.012 | 0.502 ± 0.067 | 0.454 ± 0.016 | 0.511 ± 0.017 |
| 0.610 | 0 | 0.162 ± 0.015 | 0.384 ± 0.026 | 0.379 ± 0.023 | 0.442 ± 0.017 |
| 0.731 | 0 | 0.248 ± 0.027 | 0.446 ± 0.016 | 0.580 ± 0.041 | 0.549 ± 0.014 |
| 0.879 | 0 | 0.441 ± 0.011 | 0.697 ± 0.080 | 0.847 ± 0.063 | 0.844 ± 0.052 |

Figure 9:
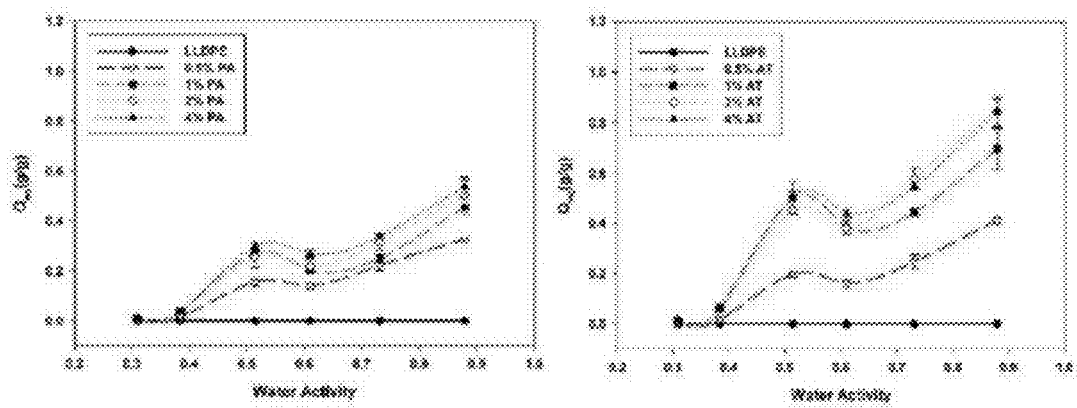
FIG. 9 depicts the sorption behavior of sample materials following to the present invention by the concentration of absorbents.
Figure 10:
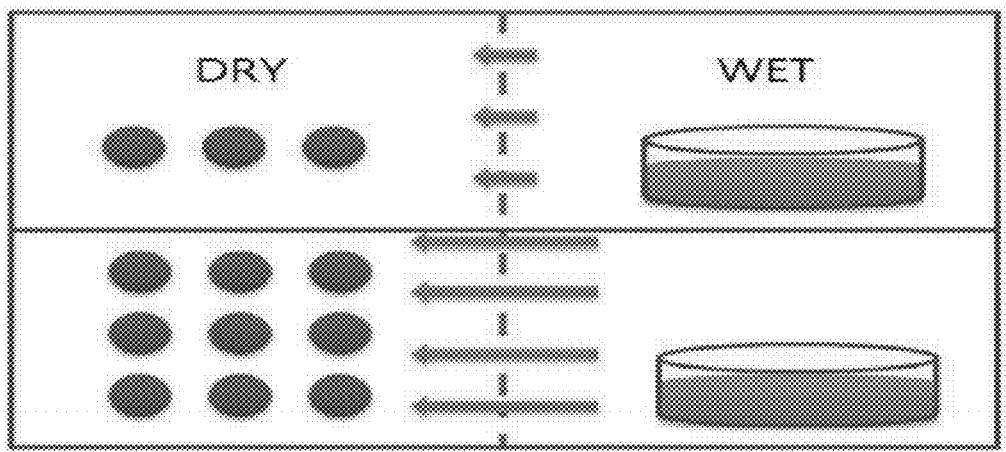
FIG. 10 depicts the moisture distribution ratio by the concentration of absorbents.

FIG. 9 depicts the amount of adsorbed atmospheric moisture by 1 g of PAPSS or ATPGAA impregnated to the LLDPE film. When comparing the moisture adsorption capacity of functional materials in FIG. 9, PAPSS showed the best adsorption capacity. In case of functional materials applied film, decreased degree of moisture adsorption capacity was shown to be different from each other at 20° C., as compared to those of functional materials. However, the moisture adsorption capacity of PAPSS applied film was lower than that of ATPGAA due to the thermal decomposition in the manufacturing process of the film. ATPGAA impregnated LLDPE film showed lower moisture adsorption capacity than that of conventional material since LLDPE in functional film interfered in the moisture adsorption.

During the 10 day duration, the sorption-isotherm showed that the moisture adsorption capacity increased as concentration of functional materials increased, and the sorption-isotherm efficiency of the materials can be considered to be ultimately equal as the duration time becomes longer. However, it is believed that the difference in the rate of the adsorption capability at the 10th day is due to the rate difference of moisture absorption speed of the two materials.

3-4. Comparison of Physical Properties of Films

Values of the tensile strength (TS) and elongation at break (EB) were measured to compare mechanical properties of the film by the quantity change of PAPSS and ATPGAA in the films.

The thickness and size of samples were cut by horizontal 25 mm by vertical 102 mm in accordance with ASTM D 3826 tensile strength standard specifications, and measured by using TA.XT texture analyzer (stable Micro System Ltd, UK). The load cell was 50 kg, and the tensile speed was 500 mm/min. Five or more samples were collected for each sample group and the mechanical properties of those were measured.

Figure 11:
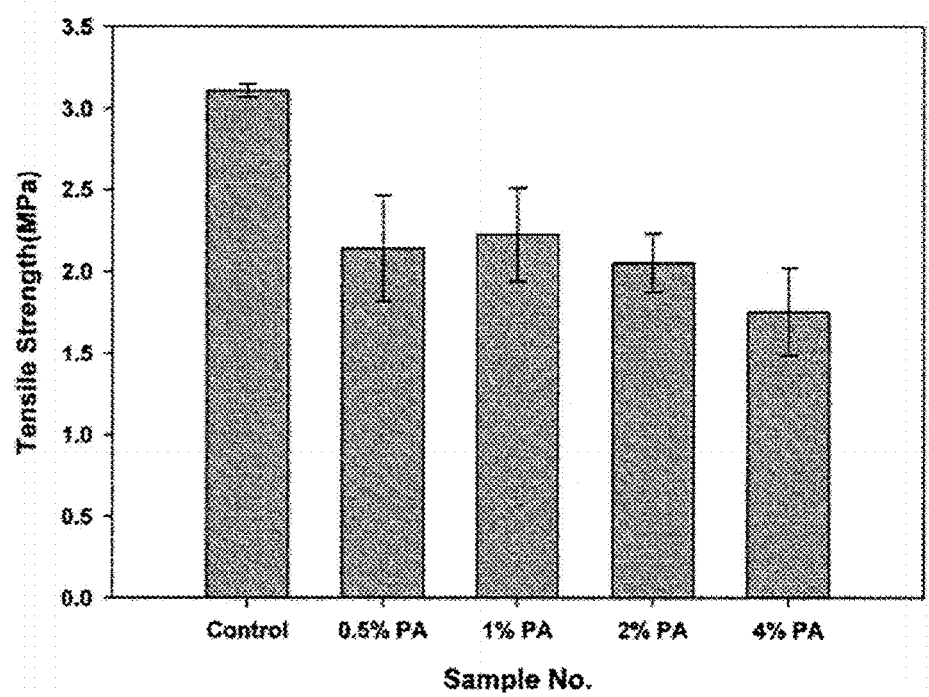
FIG. 11 depicts the mechanical properties of the film by the concentration of PAPSS.
Figure 11:
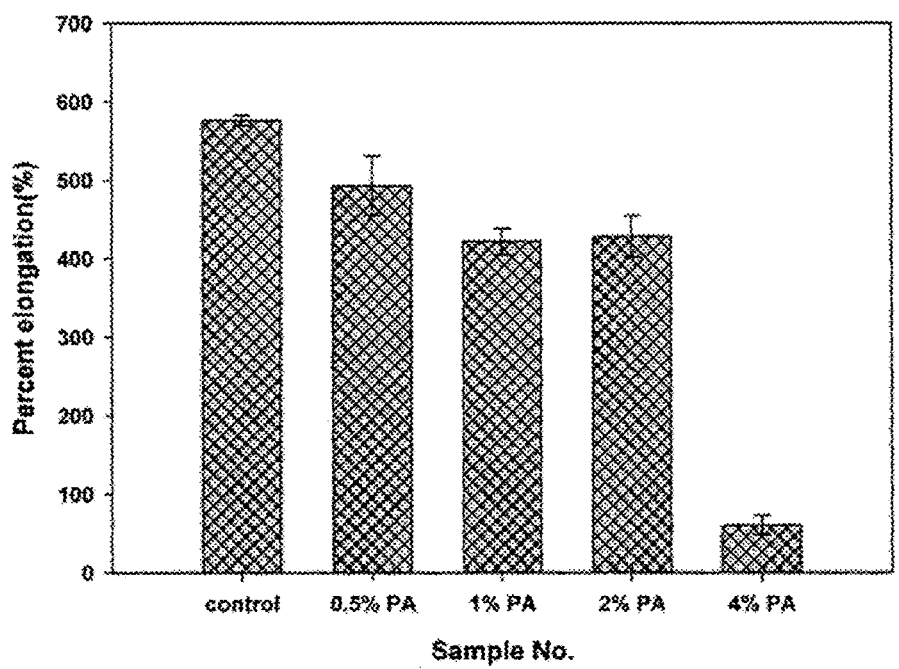
Figure 12:
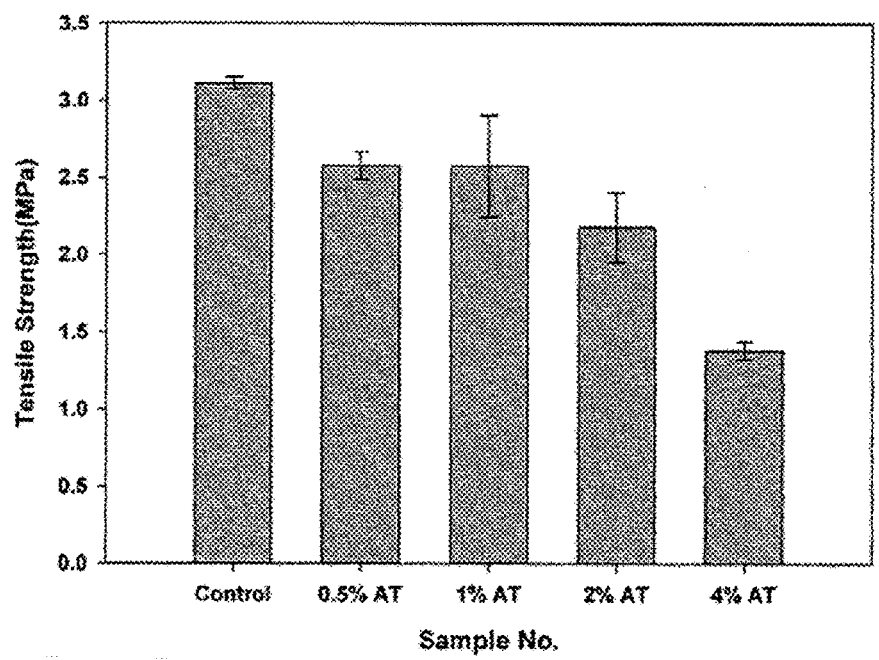
FIG. 12 depicts the mechanical properties of the film by the concentration of ATPGAA.
Figure 12:
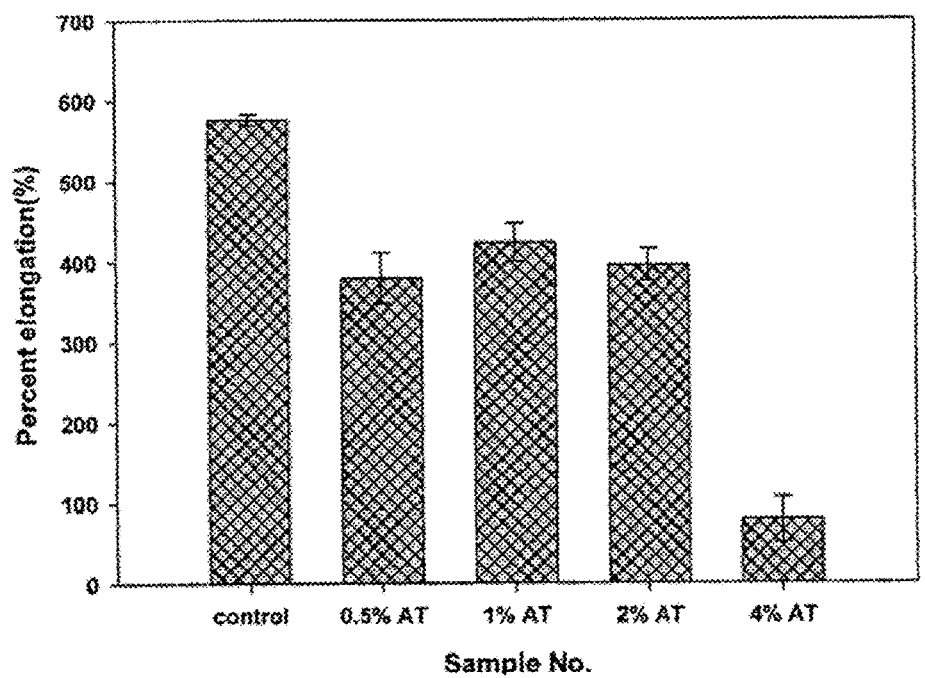

FIGS. 11 and 12 showed the physical properties of functional film by the amount of applied absorbent. For PAPSS applied film, it is shown the change of physical properties depending on the amount of PAPSS increased. The films impregnated with PAPSS were equilibrated at about 68% of TS, as compared to the control, LLDPE film. TS and EB values of the films impregnated with PAPSS of 0.5%, 1% and 2%, respectively, showed numerical differences, however each deviation was small. It can be interpreted that the TS decrease of the film is insignificant until 2% weight ratio of PAPSS added. However, when 4% PAPSS added, the mechanical properties of TS decreased to about 56% as compared to the control, LLDPE film.

When compared the changes of tensile strength (TS) by the addition of PAPSS in FIG. 11 and ATPGAA in FIG. 12, the decrease rate of TS by the addition of ATPGAA was relatively small. The foam phenomenon was observed by adding PAPSS in the film manufacturing, and so, it was considered that the decrease of physical properties was further results of the PAPSS pyrolysis at 160° C.

The EB shown in FIG. 11 showed a rapid decrease when 4% PAPSS was added. When 0.5%, 1%, 2% of PAPSS was added, the EB was decreased; however the difference of EB decrease by the concentration (amount) of material was small.

The change of physical properties by addition of ATPGAA in FIG. 12 was similar to that of PAPSS in FIG. 11. Comparing to the PAPSS impregnated films, TS was relatively high in the ATPGAA impregnated films; however the EB values of ATPGAA impregnated films were lower than those of PAPSS impregnated films. ATPGAA is one of clay-based inorganic materials, and thus, it is assumed that the physical properties of polymer film are drastically decreased when excess amount of the material added. PAPSS is one of polymer based materials, and it is assumed that chemical bonding does not occur when adding excess amount of PAPSS but it is placed independently in the empty space of the resin matrix. Basically, the differences in the physical properties of the films impregnated with the two materials are interpreted as the differences in the EB values due to the different chemical structures of the two materials.

3-5. Results

The evaluation results of adsorption capacities of films were shown in Table 12; specifically, the adsorbed amounts for silica-gel, PAPSS, ATPGAA and those of 2% absorbent impregnated functional film were compared and shown in Table 12. The 2% absorbent impregnated functional film showed small changes of TS and EB values but high quantities of moisture adsorbed. Mutual comparison of the data by environmental conditions was expressed as percentage (%) per relative humidity. The moisture adsorption efficiency of 2% PAPSS impregnated film was maximum of 33% as compared to the original material PAPSS; however the PAPSS applied film showed similar or higher adsorption capacity in the relative humidity (RH) 50% or above conditions as compared to silica-gel. The moisture adsorption capacity of 2% ATPGAA impregnated film was more than that of silica-gel in the RH 50% or above environment.

TABLE 12

| | Qeq(g/g) | | | proportion(%) | |
|---|---|---|---|---|---|
| % RH | silica-gel (A) | PAPSS(B) | 2% PAPSS film (C) | (C)/(B) × 100 | (C)/(A) × 100 |
| 0.309 | 0.059 ± 0.021 | 0.046 ± 0.021 | 0.008 ± 0.002 | 18.368 | 14.295 |
| 0.384 | 0.101 ± 0.001 | 0.130 ± 0.012 | 0.029 ± 0.002 | 22.477 | 29.021 |
| 0.514 | 0.265 ± 0.001 | 0.908 ± 0.002 | 0.254 ± 0.039 | 27.948 | 95.703 |
| 0.610 | 0.257 ± 0.001 | 0.671 ± 0.001 | 0.219 ± 0.026 | 32.570 | 85.049 |
| 0.731 | 0.258 ± 0.010 | 0.935 ± 0.004 | 0.317 ± 0.032 | 33.878 | 122.751 |
| 0.879 | 0.260 ± 0.021 | 1.620 ± 0.020 | 0.504 ± 0.060 | 31.124 | 193.621 |

| | Qeq(g/g) | | | proportion(%) | |
|---|---|---|---|---|---|
| % RH | silica-gel (A) | ATPGAA(B) | 2% ATPGAA film (C) | (C)/(B) × 100 | (C)/(A) × 100 |
| 0.309 | 0.059 ± 0.021 | 0.067 ± 0.033 | 0.014 ± 0.001 | 21.537 | 24.392 |
| 0.384 | 0.101 ± 0.001 | 0.124 ± 0.008 | 0.054 ± 0.003 | 43.312 | 53.339 |
| 0.514 | 0.265 ± 0.001 | 0.515 ± 0.031 | 0.454 ± 0.016 | 88.244 | 171.313 |
| 0.610 | 0.257 ± 0.001 | 0.350 ± 0.014 | 0.379 ± 0.023 | 108.199 | 147.404 |
| 0.731 | 0.258 ± 0.010 | 0.487 ± 0.024 | 0.580 ± 0.041 | 119.002 | 224.829 |
| 0.879 | 0.260 ± 0.021 | 1.033 ± 0.084 | 0.847 ± 0.063 | 81.938 | 325.097 |

ATPGAA and PAPSS are determined as the superior moisture absorbents which can replace silica-gel through the analysis of material selection processes, film-application, physical properties of the films after manufacturing two material impregnated films, and moisture adsorption capacity evaluation. When the absorbent was applied in manufacturing films with the consideration of rates of physical property changes and adsorption capacity decrease, 2% weight ratio absorbent adding showed to have a function of packaging products. Estimated that the moisture adsorption capacity of PAPSS decreased by PAPSS thermal-decomposition in the extrusion process of manufacturing films. However, it only occurred partially and loss of adsorption capacity of the whole film was not identified.

Experimental Example 4

Analysis of Film-Packaged Seasoned Layer

4-1. Preparation of Packaged Seasoned Layer

The commercial seasoned laver covered by corn-oil was purchased from Sae-Chang Food Co. and used for this experiment. To evaluate the storage effectiveness of the functional film applied package, the seasoned laver sample was placed in a 5 mm thick, 8 by 10 cm polyethylene terephthalate plastic tray and then each tray was packed with 12.5 by 20 cm test pouch fabricated inner layer with developed functional film ($1^{st}$ packing) and outer layer with aluminum-coated film ($2^{nd}$ packing) for the purpose of blocking external environment. Prior to packaging, all developed functional films were pretreated by placing them at 70° C. for one (1) week to remove any moisture resolved and adsorbed in the surface of the films. Experimental conditions were storing the packaged product at 23° C., 40° C., 60° C., respectively, under 50% relative humidity for a 30 day duration.

The experiment was conducted with the commercially circulated seasoned laver sample packed with silica-gel applied, as a control, same laver sample packed with no silica-gel applied, and same laver sample packed with functional film impregnated with 0.5%, 1%, 2%, and 4% ATPGAA.

4-2. Peroxide Value (PV) Test (1) Method

The peroxide value (PV) was calculated by titration with 0.01N sodium thiosulfate (Sam-chun pure chemical Co., Seoul, Korea) in accordance with the method set forth in the Industrial Standards (KS H 6019:2010).

Each seasoned laver sample was added to the mixed solution of 25 mL of acetic acid and chloroform (3:2) and heated until dissolved. 1 mL of saturated potassium iodine solution and 30 mL of distilled water were then added to the above solution of which the seasoned laver were dissolved, and allowed to store in a dark room for 10 minutes. Then, starch solution was added as an indicator to the mixed sample and the peroxide value (PV) was determined by titration with 0.01 N sodium thiosulfate. The volume of PV was calculated following to the equation below.

$$PV = \frac{(a-b) \times f \times 10}{S}$$

Where, a is the consumption volume of 0.01 N sodium thiosulfate;
b is the consumption volume of 0.01 N sodium thiosulfate at blank test;
f is the titer of 0.01 N sodium thiosulfate;
S is the sample weight.

2) Results and Interpretation

Figure 13:
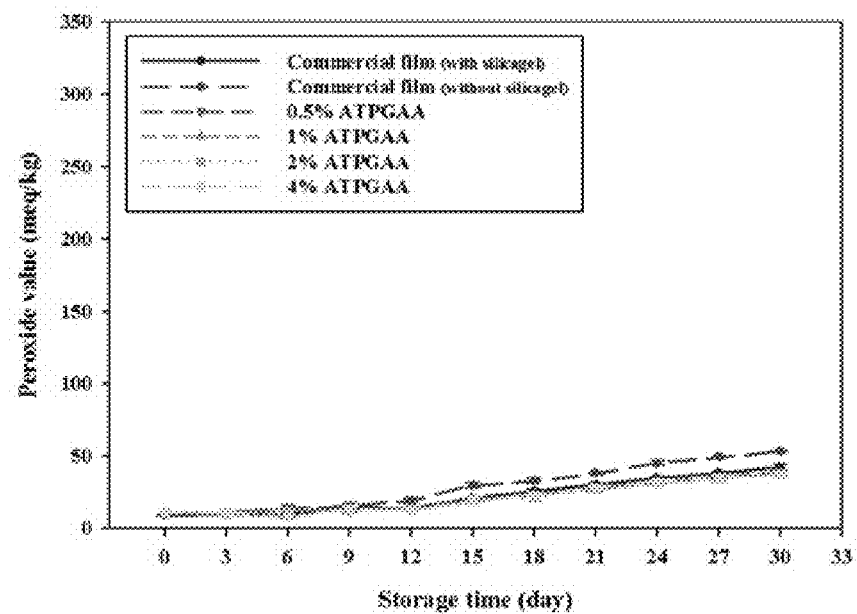
FIG. 13 depicts the peroxide value (PV) of seasoned laver sample at 23° C.
Figure 14:
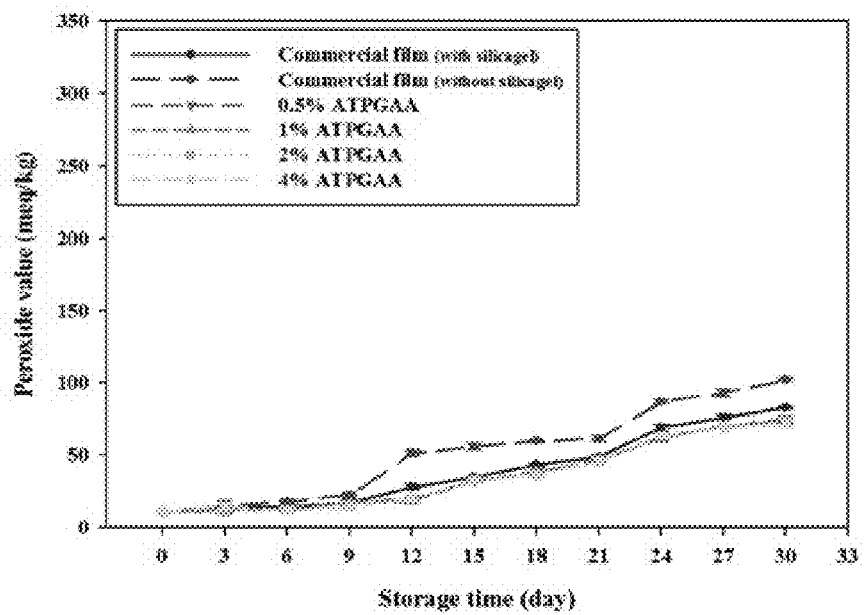
FIG. 14 depicts the peroxide value (PV) of seasoned laver sample at 40° C.
Figure 15:
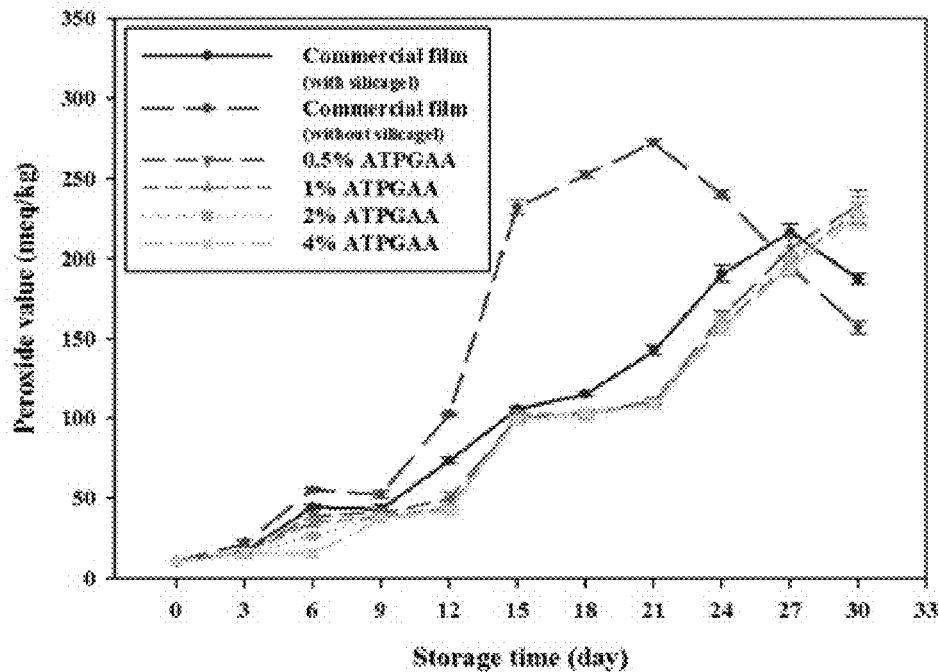
FIG. 15 depicts the peroxide value (PV) of seasoned laver sample at 60° C.

The PVs of seasoned laver packed with the functional films were shown in FIGS. 13, 14 and 15. The PVs of all samples were increased by longer storage period and higher temperature. The seasoned laver sample packed with silica-gel and the control of sample without silica-gel generated higher PVs than the samples packed with functional films.

However, there were no significant differences of PV among samples at 23° C. and 40° C. The differences of PV among samples were significant at 60° C. The samples without silica-gel presented the highest peroxide value of 240.25±2.26 meq/kg on the duration day 24.

The seasoned laver sample packed with silica-gel presented the PV of 190.55±5.10 meq/kg on the duration day 24. The seasoned laver sample packed with functional films presented similar or less PVs as that of sample packed with silica-gel. The seasoned laver packed with film impregnated with 0.5% ATPGAA presented 163.65±4.10 meq/kg at 60° C. on the day 24.

Samples packed with functional films impregnated with relatively high concentrations of ATPGAA presented relatively low PVs. Samples packed with 4% ATPGAA film showed the PV of 155.84±3.31 meq/kg. The PVs of samples packed with functional films showed the difference by the concentration of ATPGAA but the differences between each other were insignificant.

The reason why the PV differences among samples packed with functional films were insignificant is suspected that the moisture content in the package was eliminated concurrently when packed with the functional films and so, only limited impact for the moisture to change lipid oxidation of the seasoned laver was available.

The tendency of PV decreasing was shown in the samples with silica-gel and those with no silica-gel under the condition of 60° C. storing temperature.

The PVs of all samples calculated on the duration day 20 at 23° C. was over 40 meq/kg, which is the quality standard of seasoned laver specified in KS H 6019:2010. Considering the general circulation period of six (6) months for seasoned laver, it is estimated that the accelerated oxidation result was due to either incomplete (compated to commercial packaging procedures conducted normally) experimental pretreatment process of nitrogen gas or exposing seasoned laver samples to over 50% RH during the packing process of the experimental environment.

4-2. Off-Flavor (Aldehyde and Ketone) Analysis

1) Method

The infrared spectrophotometer (FTIR spectrum, Perkinelmenr) was used to determine the generation of off-flavor through storage and distribution processes. During the storage and experimental periods, the laver was monitored for rancidity using ATR-FTIR since the rancidity is related to the production of off-flavor. For the monitoring, 0.5 grams of the seasoned laver was placed on the ATR plate and was investigated with the diamond crystal of FTIR.

The investigation was conducted by scanning four (4) times with 4000~400 cm$^{-1}$ spectra range. After one sample was scanned, the ATR plate was carefully cleaned with analytical grade acetone (Duksan Co., South Korea). Three spectra replicates were obtained for each sample.

Through the previously conducted PV experiment and its results interpretation, it was identified that the generation and decomposition of peroxide occurred simultaneously and, when decomposed, it converted to aldehyde and ketone, the causes of off-flavor. Aldehyde and ketone peak values are represented indirectly as the ester carbonyl group of triglycerides mainly by the FTIR spectrum range between 1800 cm$^{-1}$ and 1700 cm$^{-1}$.

The generation degree of aldehyde and ketone can be determined indirectly by the peak value reducing of ester carbonyl group corresponding area thereof since the ester carbonyl group was changed to aldehyde and ketone through fat oxidation.

2) Results and Interpretation

Fourier transform infrared spectroscopy (FTIR), a method to analyze fats and oils, have advantages of requiring a brief sample pretreatment process and being able to analyze non-destructive samples. FTIR is mainly used to determine the degree of fat oxidation since it also can do a quantitative analysis and requires a short analyzing time (Dupuy et al., 1996; Lai et al., 1994; Rusak et al., 2003).

Figure 16:
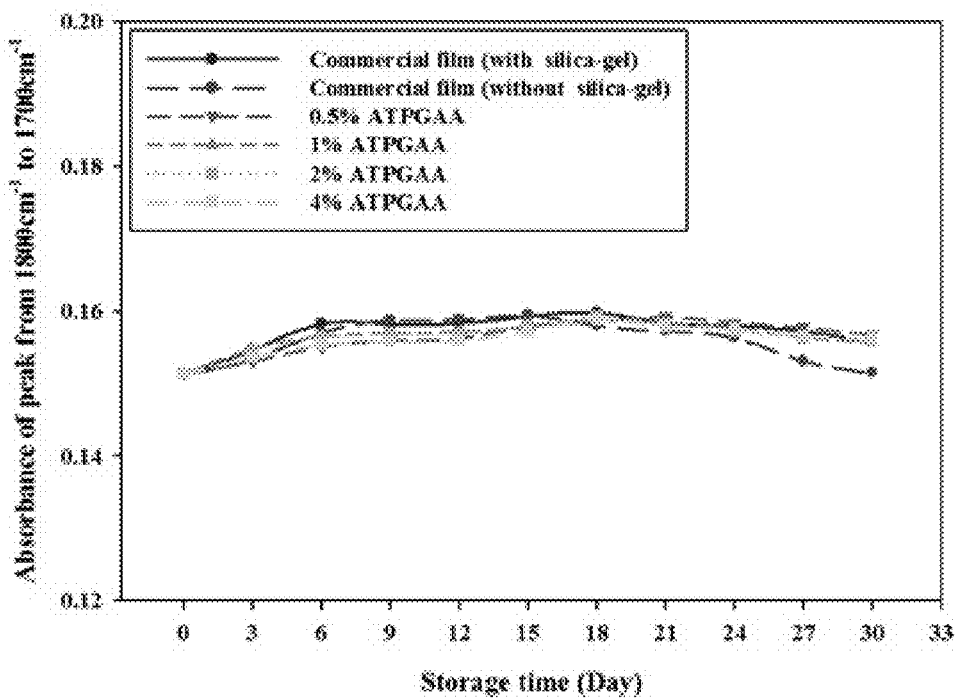
FIG. 16 depicts the absorbance peak range change from 1800 $cm^{-1}$ to 1700 $cm^{-1}$ during the storage period at 23° C.
Figure 17:
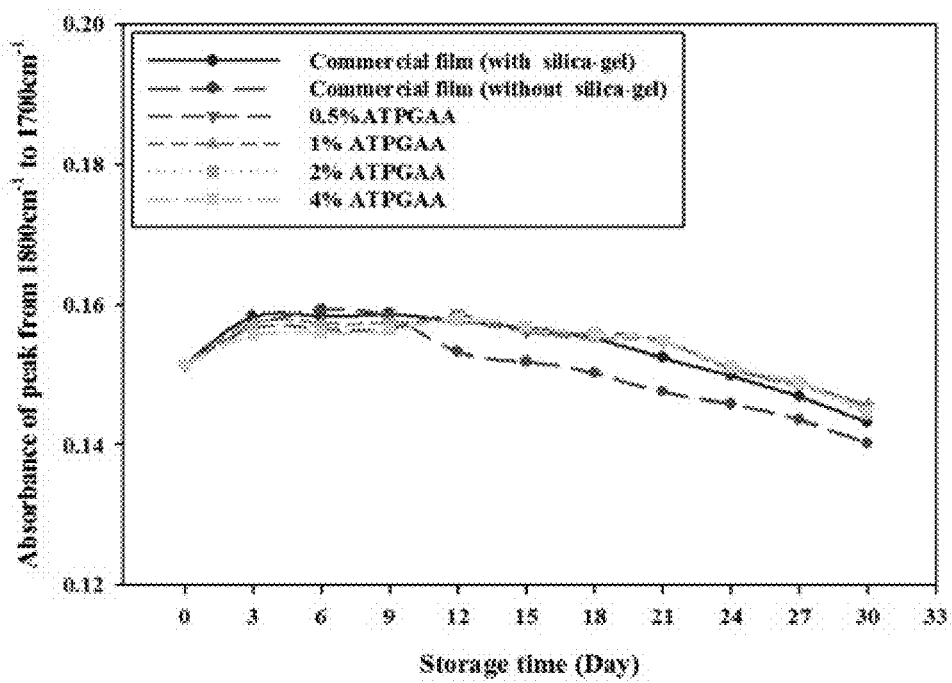
FIG. 17 depicts the absorbance peak range change from 1800 $cm^{-1}$ to 1700 $cm^{-1}$ during the storage period at 40° C.
Figure 18:
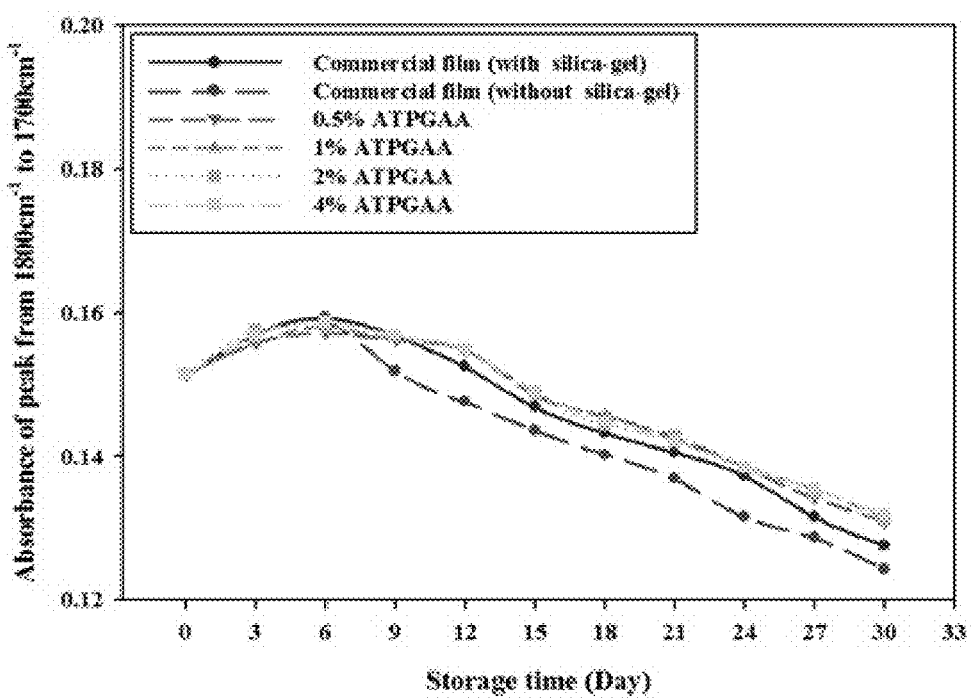
FIG. 18 depicts the absorbance peak range change from 1800 $cm^{-1}$ to 1700 $cm^{-1}$ during the storage period at 60° C.

As shown in FIGS. 16, 17 and 18, the quantity of ester carbonyl group transferred to aldehyde and ketone during the storing period was reduced. In the functional film applied sample group, the reduced quantity of ester carbonyl group was similar or less as compared to those samples applied with silica-gel.

Overall, the initial spectrum absorbance value increased slightly and then it decreased after six (6) storage days. It was identified that the initial increase occurs due to the weakened interactive molecular strength of ester carbonyl functional group (Sinelli et al., 2007).

4-3. Analysis of Texture (Fragility-Crispness)

1) Method

Seasoned laver in the market is produced by dry-roasting and adding edible salts for its taste to have marketability.

Seasoned laver itself adsorbs moisture when exposed to the moisture, and then it loses its characteristic fragile texture of crispness.

So, the texture fragility is an important criterion to evaluate its sensory quality and physicochemical quality changes. The fragility of the stored samples was determined by a texture analyzer (Stable Micro System Ltd., UK) equipped with a software program of tortilla chips method, an exponent method to measure dry food fragility. Two probes of 2 mm cylinder probe (Part No. P/2) and 35 mm cylinder probe (Part No. P/35) were used to measure. The compression in the system was measured as newton force (N) at a speed of 60 mm/min and the load cell of 50 kg.

2) Results and Interpretation

Figure 19:
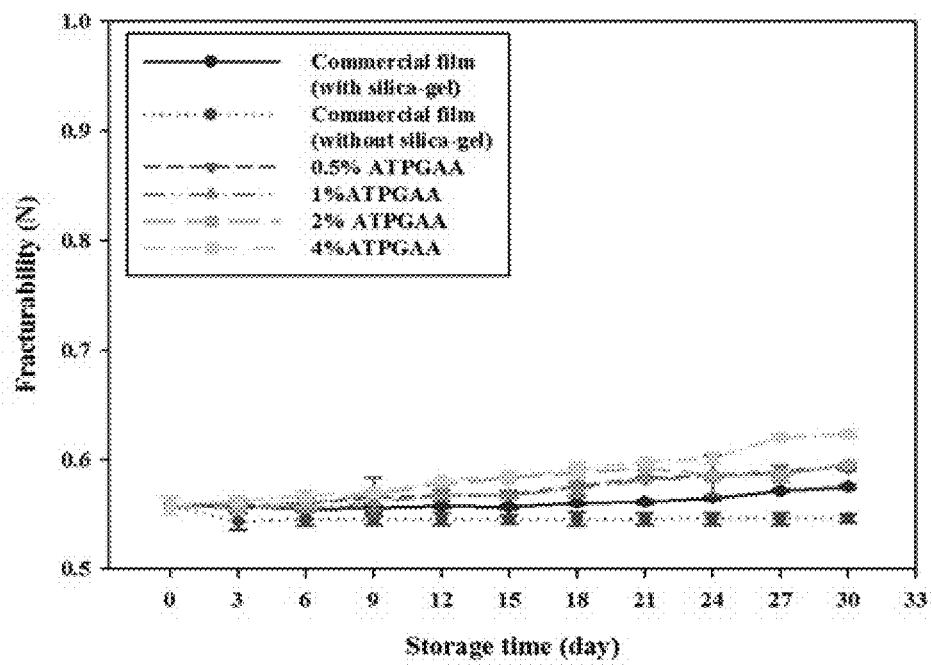
FIG. 19 depicts the fragility (crispness) of seasoned laver sample at 23° C.
Figure 20:
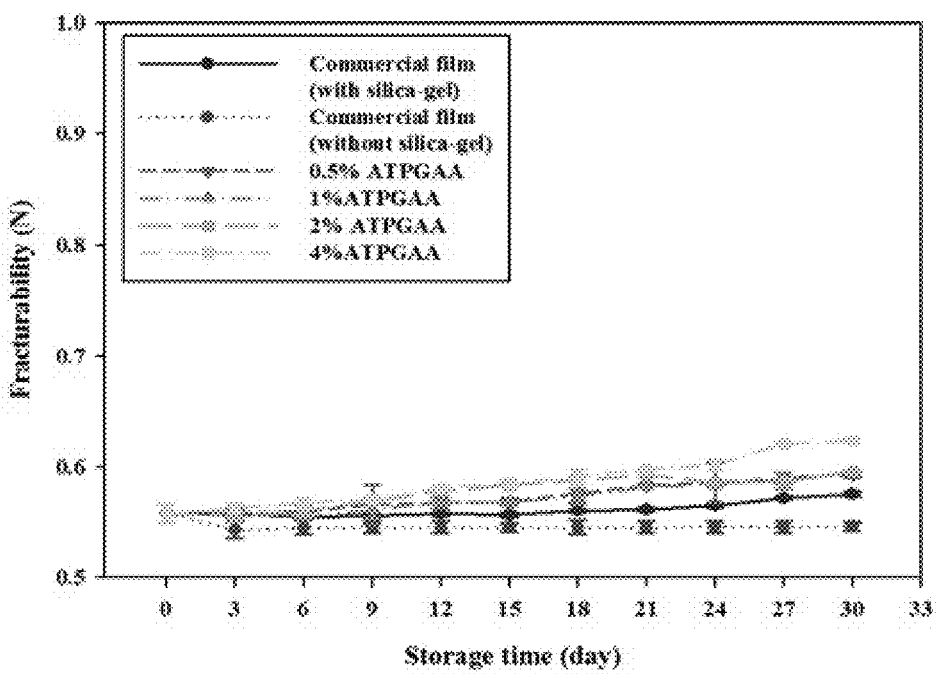
FIG. 20 depicts the fragility (crispness) of seasoned laver sample at 40° C.
Figure 21:
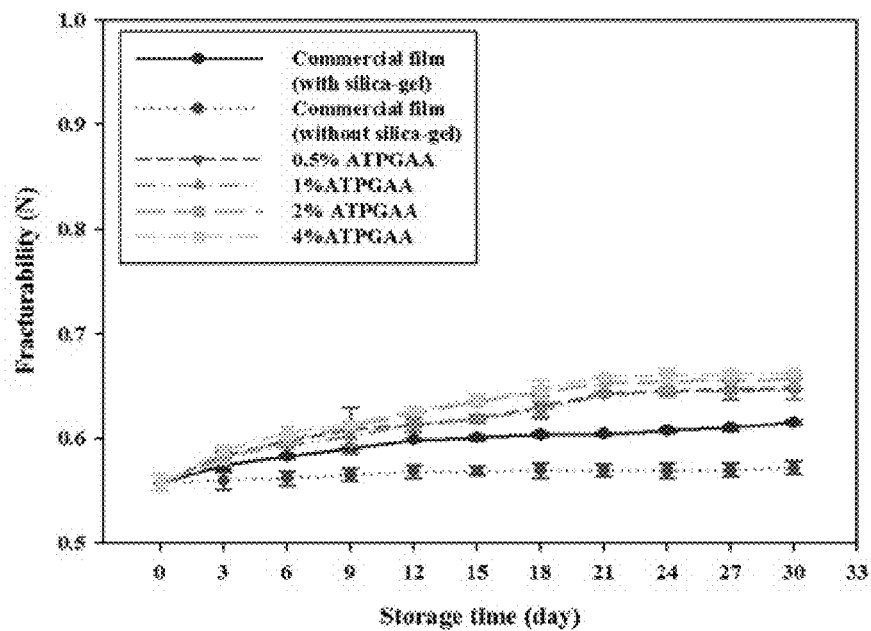
FIG. 21 depicts the fragility (crispness) of seasoned laver sample at 60° C.

The fragility of seasoned laver was closely related to the moisture within the package, and the results are shown in FIGS. 19, 20 and 21.

During the initial storage period, the fragility value was 0.56 N. On the storage duration day 30 under 60° C., the fragility value of the seasoned laver sample packed with 0.5%, 1%, 2%, 4% ATPGAA impregnated films was increased to 0.66N, 0.65N, 0.64N, 0.61N, respectively as compared to 0.57N, the value of the control, sample group packed with silica-gel. The fragility (crispness) of seasoned laver sample packed with 4% ATPGAA impregnated films at 60° C. was increased in this experiment.

4-4. Color Change

1) Method

Color of seasoned laver was measured in terms of values of Hunter L, a, and b using color-difference meter (Model CR-100 Minolta Co., Japan). The values of L, a, and b were further converted into total color difference ($\Delta E = \sqrt{\Delta L^2 + \Delta a^2 + \Delta b^2}$)

2) Results and Interpretation

The changes of color parameters, Hunter L, a, b, of seasoned laver packed with different packaging films during its initial and terminal storage periods are shown in Table 13.

L value was decreased during storage, and the decrease of $\Delta L$ value reflected the darkening of color.

Figure 22:
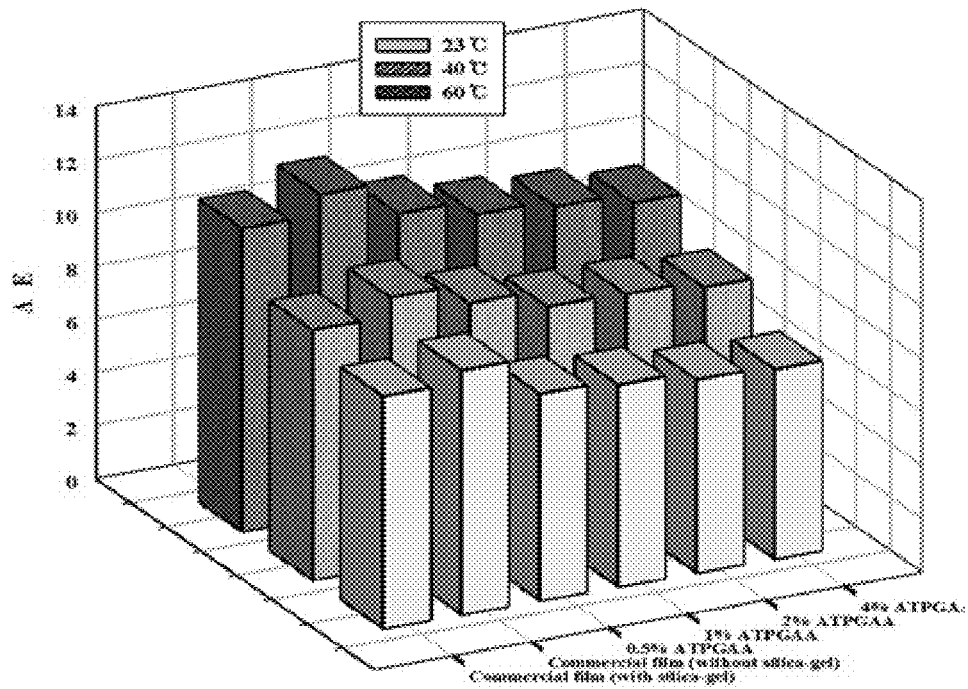
FIG. 22 depicts $\Delta E$ value of seasoned laver sample on day 30.

The seasoned laver showed an increase of $\Delta a$ and $\Delta b$ values during storage. The seasoned laver packed with the control film without silica-gel showed higher value of LE as compared to those packed with the functional films (FIG. 22), and the seasoned laver packed with the commercial package film containing silica-gel also showed relatively higher value of $\Delta E$. It can be interpreted that the present developed functional films have more effective moisture absorbency than silica-gel in sachet. The result indicates that the removal of the moisture content in seasoned laver may reduce its color change and oxidation during storage.

TABLE 13 the color changes of seasoned laver on the day 30

| Temperature (° C.) | | Commercial film (with silica-gel) | Commercial film (without silica-gel) | Concentration of ATPGAA in film structures | | | |
|---|---|---|---|---|---|---|---|
| | | | | 0.5% | 1% | 2% | 4% |
| 23° C. | $\Delta L$ | −6.412 ± 0.050 | −6.195 ± 0.100 | −5.047 ± 0.200 | −5.318 ± 0.050 | −5.074 ± 0.050 | −5.074 ± 0.050 |
| | $\Delta a$ | 2.746 ± 0.050 | 2.988 ± 0.000 | 2.255 ± 0.050 | 1.872 ± 0.100 | 1.265 ± 0.035 | 1.265 ± 0.066 |
| | $\Delta b$ | 4.588 ± 0.142 | 4.559 ± 0.000 | 4.415 ± 0.042 | 4.415 ± 0.000 | 4.492 ± 0.058 | 4.236 ± 0.058 |
| 40° C. | $\Delta L$ | −5.675 ± 0.002 | −6.204 ± 0.102 | −5.602 ± 0.300 | −4.985 ± 0.098 | −4.965 ± 0.393 | −5.051 ± 0.346 |
| | $\Delta a$ | 3.653 ± 0.066 | 3.538 ± 0.058 | 3.665 ± 0.000 | 3.540 ± 0.000 | 3.358 ± 0.000 | 3.359 ± 0.050 |
| | $\Delta b$ | 4.706 ± 0.144 | 5.016 ± 0.001 | 5.232 ± 0.043 | 4.869 ± 0.000 | 4.933 ± 0.008 | 4.869 ± 0.016 |
| 60° C. | $\Delta L$ | −4.660 ± 0.104 | −5.235 ± 0.185 | −5.141 ± 0.050 | −4.631 ± 0.046 | −4.561 ± 0.484 | −4.452 ± 0.340 |
| | $\Delta a$ | 5.397 ± 0.000 | 4.795 ± 0.016 | 5.095 ± 0.103 | 4.938 ± 0.042 | 4.579 ± 0.008 | 4.419 ± 0.050 |
| | $\Delta b$ | 4.131 ± 0.045 | 3.392 ± 0.005 | 4.567 ± 0.044 | 4.416 ± 0.044 | 4.374 ± 0.000 | 4.240 ± 0.016 |

The results can be interpreted as the increase of fragility of seasoned laver occurred by the elimination of moisture dissolved on the surface of seasoned laver at the 60° C. storage temperature, and that the ATPGAA impregnated in the packaging film absorbed the moisture which existed inside the film, and thus the drying of seasoned laver was progressed during the storage period.

Seasoned laver packed with the developed functional film showed relatively better fragility as compared to that packed with silica-gel. It is because the amount of adsorbed moisture in ATPGAA-impregnated group was higher than that of silica-gel (the amount of silica-gel used was 1 g, and that of ATPGAA was different by the concentration of ATPGAA. In case of 4% of ATPGAA, the amount of ATPGAA used was approximately 0.12 g).

The fragility of the control group with silica-gel at 60° C. was increased by the length of storage period. It is estimated that the increase in the control group occurred due to the high storing temperature affecting the moisture-absorbance of silica-gel as well as lipid oxidation during storage.

4-5. Weight Change

1) Method

Seasoned laver itself absorbs moisture if there is no other element to adsorb moisture in high water activity environment. The weight change of seasoned laver was measured to determine the moisture adsorptive capacity. The weight of seasoned laver was measured using a digital balance (Sartorius Ag Gottingen, Germany).

2) Results and Interpretation

Figure 23:
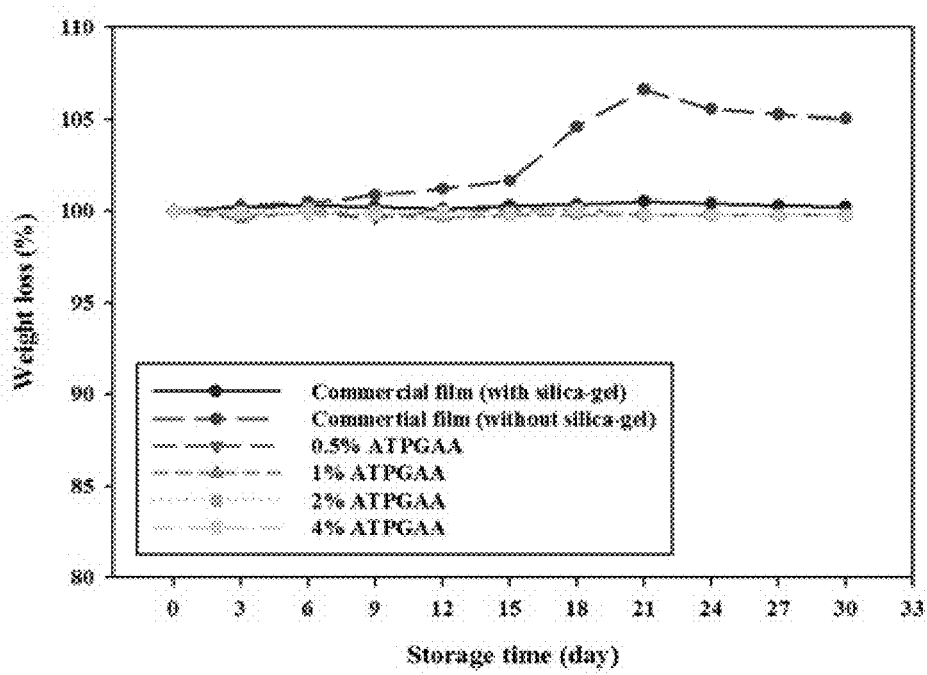
FIG. 23 depicts the weight change of seasoned laver sample at 23° C.
Figure 24:
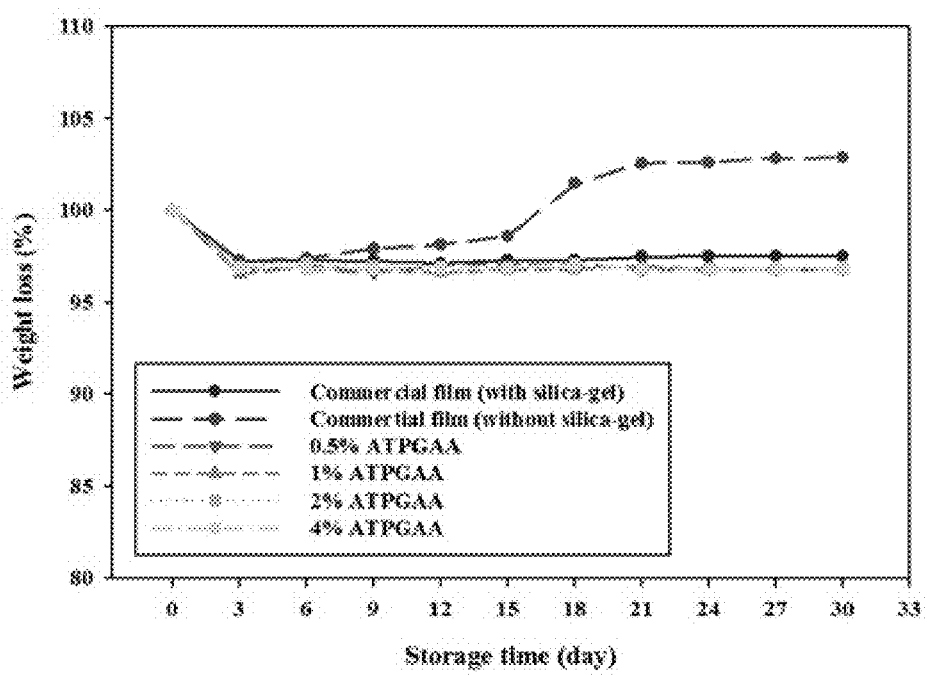
FIG. 24 depicts the weight change of seasoned laver sample at 40° C.
Figure 25:
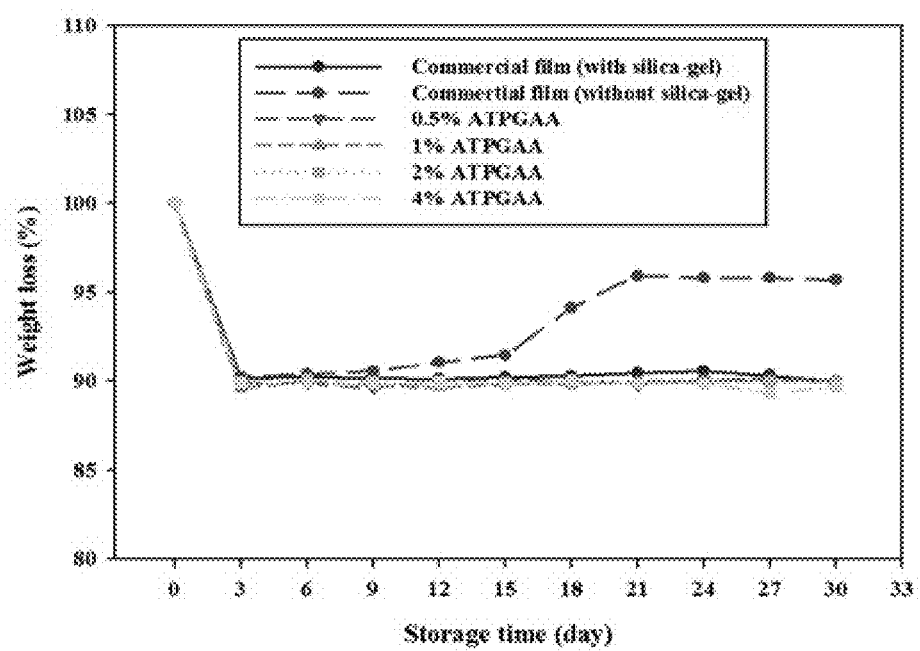
FIG. 25 depicts the weight change of seasoned laver sample at 60° C.

Weight changes of seasoned laver were presented in FIGS. 23, 24 and 25. At 40° C. and 60° C. the total weight loss was observed in the seasoned laver packed with all films on day 3. It is probable that the moisture in the seasoned laver adsorbed from the outside environment during the preparation of packaging samples was vaporized into the atmosphere surrounding the product in the package at the high temperatures.

On day 15, the weight of seasoned laver packaged with silica-gel began to increase at 23° C., 40° C., and 60° C. This can be attributed to the moisture of seasoned laver absorbed from the headspace in the package during storage. There were no clear differences between the ATPGAA impregnated films and the commercial package containing silica-gel in the seasoned laver sachets.

4-6. Sensory Evaluation

1) Method

Sensory evaluation was carried out with the experimental samples at 40° C. The quality attributes of color, taste, texture fragility, off-flavor, and overall acceptance were evaluated by twenty untrained panelists. The score of evaluation was determined by a 9-point hedonic scale. These parameters were scored with 9 for extreme like and for extreme dislike, except for off-flavor. Off-flavor was evaluated as for very strong and for least off-flavor.

2) Results and Interpretation

The sensory evaluation was conducted with samples stored at 40° C. during two months because the experimental results with samples stored at 23° C. presented the difference of scientific qualities indistinctly. The results are shown in Table 14. The result showed no significant difference among samples by considering off-flavor, fragility, color, and overall acceptance. It is suspected that high concentration of ATP-GAA impregnated film decreased the sensory quality by the absorbing excessive moisture. The developed functional films presented effectiveness for maintaining sensory quality under the oxidation accelerated condition. It means that application of developed functional film in seasoned laver packaging may extend its shelf-life in the market and increase the stability of quality because packed seasoned laver may possibly be exposed to the high humidity and temperature condition of 40° C. in summer.

products. It also can be used for packaging material for the stored products and to absorb moisture in storing warehouses.

Present invention also provides the resin composition of seasoned laver packaging films to maintain the quality of seasoned laver by eliminating the moisture adsorbed inside the packaged film.

What is claimed is:

1. A resin composition for moisture absorbing films, the composition comprising a polyethylene resin, and as a moisture absorbent, a cross-linked material with ion-exchanged attapulgite (ATPG) and poly acrylamide (AA) (ATPGAA).

2. The resin composition of claim 1, wherein weight ratio of the moisture absorbent to total weight of the resin composition is from 0.5% to 4%.

3. The resin composition of claim 1, wherein the polyethylene resin is linear low density polyethylene (LLDPE).

4. The resin composition of claim 1, wherein the polyethylene resin has a melting point between 150° C. and 180° C.

5. A moisture absorbing film manufactured with the resin composition of claim 1.

6. A manufacturing method for a moisture absorbing packaging film, the method comprising:
   a pellet manufacturing step of compounding a polyethylene resin and a moisture absorbent added; and
   adding the polyethylene resin to the pellet obtained above and conducting a blow-extrusion to compress the pellet,
   wherein the moisture absorbent to be used is a cross-linked material with ion-exchanged attapulgite (ATPG) and poly acrylamide (AA) (ATPGAA), and
   wherein the cross-linked material is synthesized by a process including a saponification step.

TABLE 14

| | \multicolumn{6}{c}{the sensory evaluation results with sample stored at 40° C.} | | | | | |
|---|---|---|---|---|---|---|
| | No.1 | No.2 | No.3 | No.4 | No.5 | No.6 |
| Off-flavor | $3.727 \pm 2.611^a$ | $5.000 \pm 2.408^a$ | $4.545 \pm 2.252^a$ | $3.818 \pm 2.183^a$ | $5.000 \pm 2.683^a$ | $4.364 \pm 2.292^a$ |
| Fracturability | $5.909 \pm 1.921^a$ | $5.455 \pm 1.368^a$ | $6.364 \pm 1.206^a$ | $5.091 \pm 1.044^a$ | $5.818 \pm 1.537^a$ | $6.727 \pm 1.348^a$ |
| Color | $5.636 \pm 2.206^a$ | $4.909 \pm 1.375^a$ | $5.909 \pm 1.446^a$ | $5.455 \pm 1.368^a$ | $5.364 \pm 1.362^a$ | $6.636 \pm 1.120^a$ |
| Taste | $5.727 \pm 2.901^{ab}$ | $4.636 \pm 1.748^{ab}$ | $5.455 \pm 1.968^{ab}$ | $5.091 \pm 11.514^{ab}$ | $4.364 \pm 1.912^{ab}$ | $5.636 \pm 1.690^{ab}$ |
| Overallacceptance | $5.000 \pm 1.789^a$ | $5.000 \pm 1.549^a$ | $5.727 \pm 1.489^a$ | $5.000 \pm 1.000^a$ | $5.545 \pm 1.695^a$ | $6.182 \pm 1.328^a$ |

$^{a-b}$Means with different letters (a-b) within the same row at same material are significantly different by Duncan's multiple range ($p<0.05$)

*No.1: Commercial film (with silica-gel)
No.2: Commercial film (without silica-gel)
No.3: 0.5% ATPGAA impregnated film
No.4: 1% ATPGAA impregnated film
No.5: 2% ATPGAA impregnated film
No.6: 4% ATPGAA impregnated film

POSSIBLE USES IN INDUSTRIES

According to the present invention, packaging films having excellent moisture absorbing function and physical properties can be manufactured. Generally in case of floral business, exported flowers are packed with silica gel and moisture absorbing paper to maintain the colors of flowers. By replacing the packing paper with the functional film manufactured by the present invention which is handy to use and highly effective to absorb moisture, the effective maintaining of product quality may increase. It may be applied to moisture sensitive dry foods such as flour, frying powder, dry fish, and the like, and also can be used effectively in storing machine parts or used metals to improve the quality of the stored 7. The method of claim 6,
   wherein, in the pellet manufacturing step, a weight ratio range of the polyethylene resin to the moisture absorbent is from 20:1 to 20:6, and
   wherein, in conducting of blow-extrusion, quantity of the polyethylene resin to be added is determined by a weight ratio of the moisture absorbent to total resin composition, the weight ratio being from 0.5% to 4%.

8. The method of claim 6, wherein a grain size of the moisture absorbent is from 100 mesh to 500 mesh.

9. The moisture absorbing film of claim 5, wherein the moisture absorbing film is for packaging products.

* * * * *